(12) United States Patent
Uthappa et al.

(10) Patent No.: US 12,481,686 B1
(45) Date of Patent: Nov. 25, 2025

(54) SYSTEMS AND METHODS FOR IMPROVED DATA CURATION AND INTEGRATION

(71) Applicant: MCKINSEY & COMPANY, INC., New York, NY (US)

(72) Inventors: Neema Kechettira Uthappa, Phoenix, AZ (US); Jennifer L. Gilbert, New York, NY (US); Steven F. Reed, New York, NY (US); A. R. Nandakumar Reddy, New York, NY (US); Subhajit Basu, New York, NY (US); Srinivasa Rao Maddili, New York, NY (US); Kunal Chakrabarty, New York, NY (US); Mujen Inanc, New York, NY (US)

(73) Assignee: MCKINSEY & COMPANY, INC., New York, NY (US)

( * ) Notice: Subject to any disclaimer, the term of this patent is extended or adjusted under 35 U.S.C. 154(b) by 0 days.

(21) Appl. No.: 18/954,057

(22) Filed: Nov. 20, 2024

(51) Int. Cl.
  *G06F 16/33* (2025.01)
  *G06F 16/332* (2019.01)
  (Continued)

(52) U.S. Cl.
  CPC ...... *G06F 16/3329* (2019.01); *G06F 16/3325* (2019.01); *G06F 40/30* (2020.01);
  (Continued)

(58) Field of Classification Search
  None
  See application file for complete search history.

(56) References Cited

U.S. PATENT DOCUMENTS

| 11,016,997 B1 * | 5/2021 | Huang | G06F 16/285 |
| 11,971,914 B1 * | 4/2024 | Watson | G06F 16/332 |

(Continued)

FOREIGN PATENT DOCUMENTS

| CN | 118504681 A | * | 8/2024 |
| CN | 118778941 A | * | 10/2024 |

(Continued)

OTHER PUBLICATIONS

Translation of CN118504681A (Year: 2024).*

(Continued)

*Primary Examiner* — Richard Z Zhu
(74) *Attorney, Agent, or Firm* — MARSHALL, GERSTEIN & BORUN LLP

(57) ABSTRACT

Systems and methods for improved data curation and integration are disclosed. An example system includes one or more processors; and a memory storing instructions that cause the system to: receive an initial query, query an external database to obtain a set of keywords, topics, and other queries pertinent to the initial query, and embed articles into a database. The system may also append the keywords, topics, and other queries to the initial query to obtain an external data query and embedded articles to the initial query to obtain an internal data query; and generate (i) an external output by applying a large language model (LLM) to the external data query and (ii) an internal output by applying the LLM to the internal data query. The system may also combine the internal output with the external output to obtain a combined output and cause the combined output to be displayed.

18 Claims, 12 Drawing Sheets

(51) Int. Cl.
    *G06F 16/3329*     (2025.01)
    *G06F 40/30*     (2020.01)
    *H04L 51/02*     (2022.01)
    *G06F 16/334*     (2025.01)
    *G06F 40/211*     (2020.01)
    *G10L 15/18*     (2013.01)

(52) U.S. Cl.
    CPC .......... *H04L 51/02* (2013.01); *G06F 16/3347* (2019.01); *G06F 40/211* (2020.01); *G10L 15/1815* (2013.01); *G10L 15/1822* (2013.01)

(56) References Cited

U.S. PATENT DOCUMENTS

| | | | |
|---|---|---|---|
| 12,306,828 B1* | 5/2025 | Chakraborty | G06F 16/24522 |
| 2024/0267344 A1* | 8/2024 | Mulligan | H04L 51/214 |
| 2024/0289407 A1* | 8/2024 | Rofouei | G06F 16/9577 |
| 2024/0330589 A1* | 10/2024 | Kotaru | G06F 40/205 |
| 2024/0386490 A1* | 11/2024 | Nasir | G06Q 40/03 |
| 2024/0394285 A1* | 11/2024 | Cunningham | H04L 51/02 |
| 2025/0005052 A1* | 1/2025 | Khosla | G06F 16/3344 |
| 2025/0022200 A1* | 1/2025 | Huang | G10L 13/047 |
| 2025/0028746 A1* | 1/2025 | Cantu | G06F 16/3328 |
| 2025/0103625 A1* | 3/2025 | Addanki | G06F 16/3326 |

FOREIGN PATENT DOCUMENTS

| | | | |
|---|---|---|---|
| CN | 118820405 A | * | 10/2024 |
| CN | 119003576 A | * | 11/2024 |

OTHER PUBLICATIONS

Translation of CN118778941 B (Year: 2024).*
Translation of CN 118820405 B (Year: 2024).*
Translation of CN 119003576 A (Year: 2024).*

* cited by examiner

SYSTEMS AND METHODS FOR IMPROVED DATA CURATION AND INTEGRATION

FIELD OF THE DISCLOSURE

The present disclosure generally relates to optimizing data curation, and more particularly, to systems and methods for improved data curation and integration during chat sessions through the use of artificial intelligence (AI) agents implementing various machine learning (ML) techniques in specific configurations that minimize querying latency, reduce processing and memory resource requirements, and improve output accuracy/relevancy.

BACKGROUND

The field of online information retrieval and analysis has seen significant advancements with the integration of artificial intelligence (AI) and machine learning (ML) technologies. However, these technologies often face challenges in accurately understanding user queries, effectively retrieving relevant documents/sources, and providing succinct, impactful content in a manner that aligns with user intents. The dynamic nature of online content and the broad range of user queries necessitate more sophisticated methods for enhancing the relevance and contextuality of search results.

SUMMARY

In some aspects, the techniques described herein relate to a computer-implemented method, including: receiving, by one or more processors, an initial query from a user as part of a chat session; querying, by the one or more processors, an external database to obtain a set of keywords, a set of topics, and a set of other queries that are pertinent to the initial query; embedding, by the one or more processors, articles from a knowledge database and articles from a curated database into a database of embedded articles; selecting, by the one or more processors, a set of embedded articles from the database of embedded articles, wherein each article in the set of embedded articles has a corresponding similarity score surpassing a threshold value when compared to the initial query using a text similarity metric; appending, by the one or more processors, (i) the set of keywords, the set of topics, and the set of other queries to the initial query to obtain an external data query and (ii) the set of embedded articles to the initial query to obtain an internal data query; generating, by the one or more processors, (i) an external output by applying a large language model (LLM) to the external data query and (ii) an internal output by applying the LLM to the internal data query; combining, by the one or more processors, the internal output with the external output to obtain a combined output; and causing, by the one or more processors, the combined output to be displayed to a user during the chat session.

In some aspects, the techniques described herein relate to a computer-implemented method, further including: executing, by the one or more processors, an artificial intelligence (AI) agent configured to generate one or more prompts for the LLM using a chain of thoughts approach and multi-hop query generation that cause the LLM to (i) summarize and rank content provided in the combined output and (ii) generate one or more intermediate reasoning steps indicating how the LLM reached the combined output.

In some aspects, the techniques described herein relate to a computer-implemented method, further including: obtaining, by the one or more processors, (i) a first external output and a second external output by applying the LLM to the external data query and (ii) a first internal output and a second internal output by applying the LLM to the internal data query; and iteratively prompting, by the one or more processors executing an AI agent, the LLM to generate the external output and the internal output by incorporating one or more critiques associated with at least one of (i) the first external output, (ii) the second external output, (iii) the first internal output, or (iv) the second internal output into a subsequent prompt.

In some aspects, the techniques described herein relate to a computer-implemented method, wherein generating the external output and the internal output further includes, in parallel: generating, by the one or more processors via an AI agent using semantic routing and multi-hop dynamic query generation, (i) one or more external topics to search through the curated database and (ii) one or more internal topics to search through the knowledge database; generating, by the one or more processors via the AI agent, (i) an external summary based on the search through the curated database and (ii) an internal summary based on the search through the knowledge database; and generating, by the one or more processors via the AI agent, the external output based on the external summary and the internal output based on the internal summary.

In some aspects, the techniques described herein relate to a computer-implemented method, further including: generating, by the one or more processors, a plurality of external summaries based on the search through the curated database and (ii) a plurality of internal summaries based on the search through the knowledge database; determining, by the one or more processors, weighted matrix rankings for each external summary and each internal summary, wherein the weighted matrix rankings are based on: (i) a key word importance value, (ii) a faithfulness value, (iii) a detail value, (iv) a page ranking based on one or more source references, and (v) a re-rank matrix from a retriever agent; and generating, by the one or more processors, the external output and the internal output based on the weighted matrix rankings for each external summary and each internal summary.

In some aspects, the techniques described herein relate to a computer-implemented method, further including: causing, by the one or more processors, the combined output to be displayed to a user during the chat session, wherein the combined output includes the external summary, the internal summary, and an indication of a source reference from the curated database or the knowledge database; receiving, at the one or more processors, a subsequent query corresponding to a keyword of the combined output; appending, by the one or more processors, at least the keyword to the subsequent query; and querying, by the one or more processors, the external database to obtain a subsequent set of keywords, a subsequent set of topics, and a subsequent set of other queries that are pertinent to the subsequent query.

In some aspects, the techniques described herein relate to a computer-implemented method, further including: storing, by the one or more processors, at least one of: (i) the set of keywords, (ii) the set of topics, (iii) the set of other queries, (iv) the initial query, (v) the external data query, (vi) the internal data query, (vii) the set of embedded articles, (viii) the external output, (ix) the internal output, or (x) the combined output in a chat session storage location; determining, by the one or more processors, an outcome of the chat session; and re-training, by the one or more processors, an AI agent based on the outcome of the chat session and one or more data entries in the chat session storage location.

In some aspects, the techniques described herein relate to a computer-implemented method, wherein embedding the articles from the knowledge database and the articles from the curated database into the database of embedded articles further includes: obtaining, by the one or more processors, an application programming interface (API) key from a custom search engine by creating a project and enabling a custom search API for the project; acquiring, by the one or more processors, a search engine identification (ID) associated with the custom search engine; querying, by the one or more processors using the API key and the search engine ID, the custom search engine with a search query based on the initial query; generating, by the one or more processors executing the LLM, a prompt for an AI agent to identify key phrases based on results from the querying the custom search engine; extracting, by the one or more processors executing the AI agent, one or more keywords and one or more topics; embedding, by the one or more processors, the one or more keywords and the one or more topics; and storing, by the one or more processors, the one or more embedded keywords and the one or more embedded topics in the embedding database.

In some aspects, the techniques described herein relate to a computer-implemented method, wherein the corresponding similarity score associated with each article in the set of embedded articles is not exceeded by the corresponding similarity score associated with any article in the embedded database that is not included in the set of embedded articles.

In some aspects, the techniques described herein relate to a system including: one or more processors; and a memory storing instructions that, when executed by the one or more processors, cause the system to perform operations including: receiving an initial query from a user as part of a chat session; querying an external database to obtain a set of keywords, a set of topics, and a set of other queries that are pertinent to the initial query; embedding articles from a knowledge database and articles from a curated database into a database of embedded articles; selecting a set of embedded articles from the database of embedded articles, wherein each article in the set of embedded articles has a corresponding similarity score surpassing a threshold value when compared to the initial query using a text similarity metric; appending (i) the set of keywords, the set of topics, and the set of other queries to the initial query to obtain an external data query and (ii) the set of embedded articles to the initial query to obtain an internal data query; generating (i) an external output by applying a large language model (LLM) to the external data query and (ii) an internal output by applying the LLM to the internal data query; combining the internal output with the external output to obtain a combined output; and causing the combined output to be displayed to a user during the chat session.

In some aspects, the techniques described herein relate to a system, wherein the instructions, when executed by the one or more processors further cause the system to perform operations including: executing an artificial intelligence (AI) agent configured to generate one or more prompts for the LLM using a chain of thoughts approach and multi-hop query generation that cause the LLM to (i) summarize and rank content provided in the combined output and (ii) generate one or more intermediate reasoning steps indicating how the LLM reached the combined output.

In some aspects, the techniques described herein relate to a system, wherein the instructions, when executed by the one or more processors further cause the system to perform operations including: obtaining (i) a first external output and a second external output by applying the LLM to the external data query and (ii) a first internal output and a second internal output by applying the LLM to the internal data query; and iteratively prompting an AI agent executing the LLM to generate the external output and the internal output by incorporating one or more critiques associated with at least one of (i) the first external output, (ii) the second external output, (iii) the first internal output, or (iv) the second internal output into a subsequent prompt.

In some aspects, the techniques described herein relate to a system, wherein the instructions, when executed by the one or more processors further cause the system to generate the external output and the internal output by, in parallel: generating via an AI agent using semantic routing and multi-hop dynamic query generation, (i) one or more external topics to search through the curated database and (ii) one or more internal topics to search through the knowledge database; generating via the AI agent, (i) an external summary based on the search through the curated database and (ii) an internal summary based on the search through the knowledge database; and generating via the AI agent, the external output based on the external summary and the internal output based on the internal summary.

In some aspects, the techniques described herein relate to a system, wherein the instructions, when executed by the one or more processors further cause the system to perform operations including: generating a plurality of external summaries based on the search through the curated database and a plurality of internal summaries based on the search through the knowledge database; determining weighted matrix rankings for each external summary and each internal summary, wherein the weighted matrix rankings are based on: (i) a keyword importance value, (ii) a faithfulness value, (iii) a detail value, (iv) a page ranking based on one or more source references, and (v) a re-rank matrix from a retriever agent; and generating the external output and the internal output based on the weighted matrix rankings for each external summary and each internal summary.

In some aspects, the techniques described herein relate to a system, wherein the instructions, when executed by the one or more processors further cause the system to perform operations including: causing the combined output to be displayed to a user during the chat session, wherein the combined output includes the external summary, the internal summary, and an indication of a source reference from the curated database or the knowledge database; receiving a subsequent query corresponding to a keyword of the combined output; appending at least the keyword to the subsequent query; and querying the external database to obtain a subsequent set of keywords, a subsequent set of topics, and a subsequent set of other queries that are pertinent to the subsequent query.

In some aspects, the techniques described herein relate to a system, wherein the instructions, when executed by the one or more processors further cause the system to perform operations including: storing at least one of: (i) the set of keywords, (ii) the set of topics, (iii) the set of other queries, (iv) the initial query, (v) the external data query, (vi) the internal data query, (vii) the set of embedded articles, (viii) the external output, (ix) the internal output, or (x) the combined output in a chat session storage location; determining an outcome of the chat session; and re-training an AI agent based on the outcome of the chat session and one or more data entries in the chat session storage location.

In some aspects, the techniques described herein relate to a system, wherein the instructions, when executed by the one or more processors further cause the system to embed the articles from the knowledge database and the articles from the curated database into the database of embedded articles by: obtaining an application programming interface (API) key from a custom search engine by creating a project and enabling a custom search API for the project; acquiring a search engine identification (ID) associated with the custom search engine; querying the custom search engine with a search query based on the initial query using the API key and the search engine ID; generating a prompt for an AI agent to identify key phrases based on results from the querying the custom search engine; extracting one or more keywords and one or more topics; embedding the one or more keywords and the one or more topics; and storing the one or more embedded keywords and the one or more embedded topics in the embedding database.

In some aspects, the techniques described herein relate to a system, wherein the corresponding similarity score associated with each article in the set of embedded articles is not exceeded by the corresponding similarity score associated with any article in the embedded database that is not included in the set of embedded articles.

In some aspects, the techniques described herein relate to one or more non-transitory computer-readable storage media including instructions that, when executed by one or more processors, cause the one or more processors to: receive an initial query from a user as part of a chat session; query an external database to obtain a set of keywords, a set of topics, and a set of other queries that are pertinent to the initial query; embed articles from a knowledge database and articles from a curated database into a database of embedded articles; select a set of embedded articles from the database of embedded articles, wherein each article in the set of embedded articles has a corresponding similarity score surpassing a threshold value when compared to the initial query using a text similarity metric; append (i) the set of keywords, the set of topics, and the set of other queries to the initial query to obtain an external data query and (ii) the set of embedded articles to the initial query to obtain an internal data query; generate (i) an external output by applying a large language model (LLM) to the external data query and (ii) an internal output by applying the LLM to the internal data query; combine the internal output with the external output to obtain a combined output; and cause the combined output to be displayed to a user during the chat session.

In some aspects, the techniques described herein relate to one or more non-transitory computer-readable storage media, including instructions that, when executed by one or more processors, cause the one or more processors to: generate via an AI agent using semantic routing and multi-hop dynamic query generation, (i) one or more external topics to search through the curated database and (ii) one or more internal topics to search through the knowledge database; generate via the AI agent, (i) an external summary based on the search through the curated database and (ii) an internal summary based on the search through the knowledge database; and generate via the AI agent, the external output based on the external summary and the internal output based on the internal summary.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive and/or limiting.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
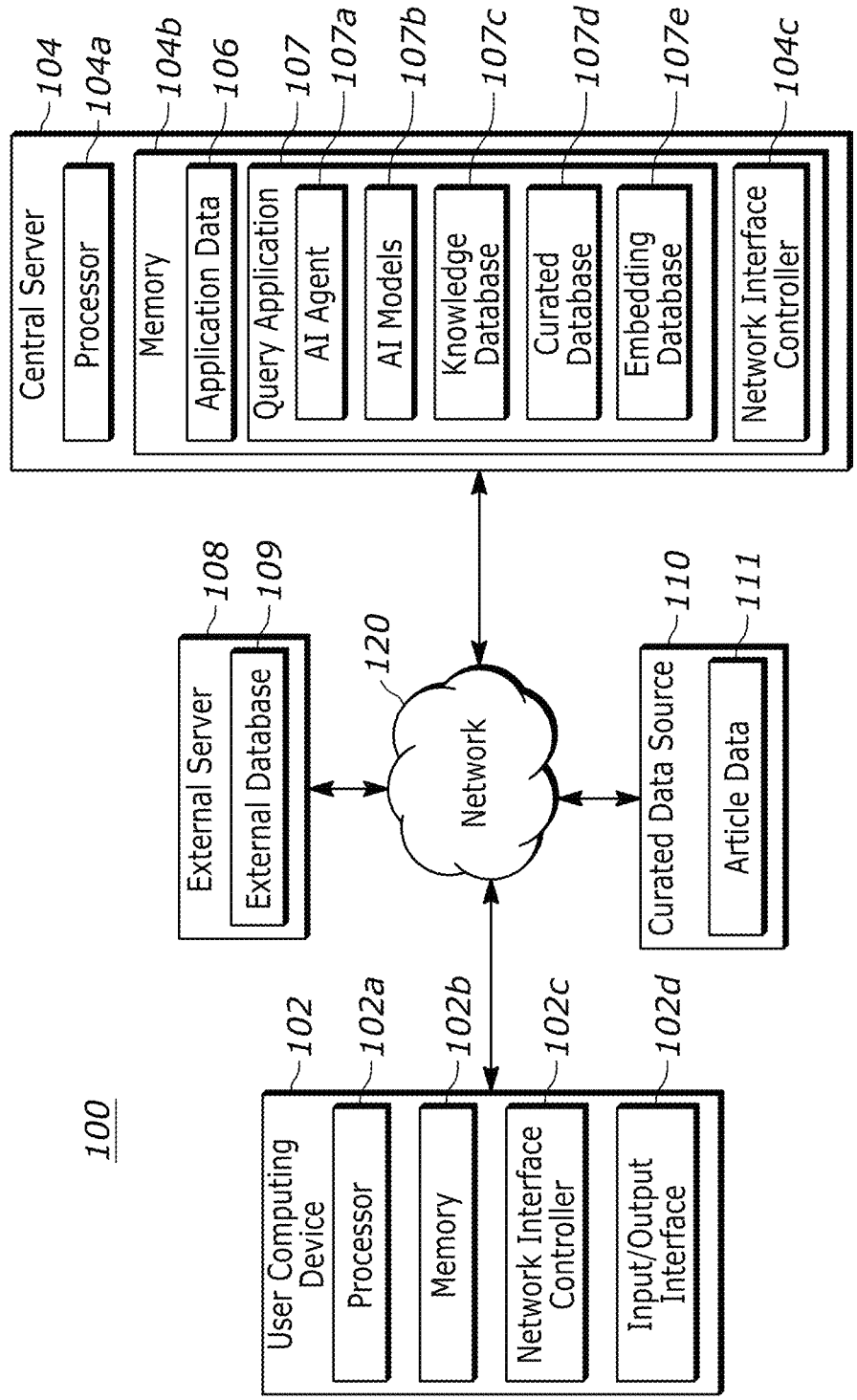
FIG. 1 illustrates an example computing environment for implementing various techniques associated with data curation and integration, in accordance with various embodiments described herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

The present techniques involve a computer-implemented method and system for enhancing user interaction within a chat session through the integration of external and internal data sources, leveraging large language models (LLMs) for generating comprehensive responses. These techniques include receiving an initial query from a user and enriching this query by querying an external database to obtain a set of keywords, topics, and other queries relevant to the initial query. Additionally, the techniques involve embedding articles from both a knowledge database and a curated database into a database of embedded articles, selecting a subset of these articles based on their similarity to the initial query, and generating both external and internal outputs by applying an LLM to the enriched queries. These outputs are combined and displayed to the user, providing a rich, contextually relevant response that leverages the breadth of available data.

These techniques enhance the processing efficiency of the underlying computing system, e.g., by selectively embedding articles and utilizing similarity values to filter the most relevant content. Many conventional techniques employed to provide relevant outputs/results during a live chat session involve receiving a user query, performing key word searches based on the information contained in the user query, and simply presenting a list or set of information that is returned. Some conventional techniques provide a minimal level of curation by, for example, returning only the first five/ten results provided by the search query, as such search queries can often yield vast quantities of data, any of which, may potentially be relevant to the user query. However, even these improved conventional techniques generally fail to provide relevant information because they cannot perform highly granular relevance evaluations quickly enough during a live chat session with a user.

The present techniques overcome these challenges faced by conventional techniques by embedding articles and/or other information sources into an embedding database and selecting embedded articles for inclusion as part of subsequent prompts input into LLMs. These techniques thereby (1) provide highly relevant information as inputs for analysis (resulting in highly relevant outputs) based on embedding similarities and (2) ensure that the available processing power is directed towards analyzing the most pertinent information, as a result of the highly efficient embedding similarity metric comparisons described herein. This selective and efficient approach, coupled with the application of LLMs, streamlines and optimizes the processing efficiency of the available computational resources, in a manner that is not present in conventional techniques. Thus, the present techniques improve over these conventional techniques at least by improving the utilization of processing resources and the accuracy/relevance of outputs in a way that such conventional techniques are not capable of achieving.

Further, the present techniques optimize network usage and memory usage efficiency, e.g., through the embedding and querying processes that are designed to minimize data file storage sizes and unnecessary data transfers. As mentioned, most conventional techniques provide raw data/results in response to user queries, which consumes significant network and memory resources to analyze/filter through such large data sets and/or store the data sets in working memory. These conventional techniques can thereby occupy substantial network/memory resources in response to each individual query, as such techniques do not typically utilize long-term storage of relevant results or otherwise take steps to reuse previously performed searches, which would reduce the impact on such resources.

By contrast, the present techniques solve these issues associated with conventional techniques by embedding articles into a database of embedded articles and selecting only those with high relevance scores. This approach minimizes the memory footprint of each query response operation, allowing for the handling of larger datasets and more complex user queries without compromising system performance than was previously achievable using conventional techniques. Moreover, the present techniques select and retrieve only the most relevant external and internal embedded data. This targeted data retrieval, in combination with the reduction in data file size resulting from the embeddings themselves, not only reduces the bandwidth required for data transfer, but also expedites the response time, making the chat session more interactive and less prone to delays caused by data overload.

Additionally, in certain embodiments, the database of embedded articles is a long-term storage location for source (e.g., articles, etc.) embeddings, which enables the present techniques to reuse and/or otherwise leverage the actions (e.g., source retrieval/analysis, embedding) performed by the system in previous query response operations to create an iteratively more efficient query response process. For example, as the systems of the present techniques build the database of embedded articles with additional article embeddings, the present techniques reduce the need (present in conventional systems) to continually re-analyze vast sets of raw data to determine relevant data for a user query. Instead, the present techniques can readily and easily reuse/reference the database of embedded articles to determine whether additional searching is necessary, and if not, can quickly return relevant articles based on the embeddings already present in the database of embedded articles without having to re-analyze the articles themselves.

Moreover, the iterative prompting mechanisms and integration of AI agents to generate prompts through chain of thoughts and multi-hop query generation improve the accuracy and relevancy of resulting outputs, in a manner that conventional techniques do not provide. Most conventional techniques lack a significant measure of critique or other feedback of outputs provided by, e.g., an LLM. This often results from a tradeoff that forces the designers of such conventional systems to minimize output post-processing or re-iterations (e.g., critique, context enhancement/improvements) to provide users with more timely responses due to the inefficiencies of the searching and data retrieval process, as described above. Accordingly, these conventional techniques frequently suffer from less relevant and/or less accurate responses because critiquing the initial outputs can, e.g., lead to exceedingly long response times.

The present techniques overcome these challenges of conventional techniques by performing and incorporating critiques of previous outputs into subsequent prompts in a manner that quickly and efficiently introduces a dynamic learning component to the response process. In particular, generating prompts using a chain of thoughts approach and multi-hop query generation enables the LLM to summarize and rank content more effectively than systems that lack such a configuration, providing intermediate reasoning steps that offer insights into how conclusions were reached. This not only enriches the user experience by offering a deeper understanding of the response generation process but also enhances the accuracy and relevance of the responses provided, by for example, enabling the system to navigate through vast amounts of data efficiently by focusing the system on the most likely relevant next sub-query or the most likely relevant next topic of interest without wasting processing time evaluating content that is unlikely to provide relevant insights/answers. By determining weighted matrix rankings for each summary based on various criteria, the system ensures that the most accurate, faithful, and detailed summaries are presented to the user. This adaptability ensures that the system continuously improves its response quality, making it more attuned to user needs and preferences over time, while also significantly enhancing the user's ability to quickly grasp complex information, making the chat session more informative and engaging.

In accordance with the above, and with the disclosure herein, the present disclosure includes improvements in computer functionality or in improvements to other technologies at least because the disclosure describes that, e.g., a hosting server (e.g., central server), or otherwise computing device (e.g., a user computing device), is improved where the performance of the hosting server or computing device is enhanced by an AI agent and AI models. This agent and corresponding AI models, executing on the hosting server or user computing device, can accurately and efficiently determine relevant articles from a database of embedded articles to a user query, generate appended/enhanced prompts for interpretation by a ML model (e.g., an LLM) based on such relevant articles, and generate data-rich outputs based on highly curated data sets in a manner that increases output accuracy while reducing the required computational overhead relative to conventional techniques. That is, the present disclosure describes improvements in the functioning of the computer itself or "any other technology or technical field" because a hosting server or user computing device, is enhanced with the AI agent and AI models to generate a relevant, granular output (e.g., query response) with greater accuracy than was previously achievable with conventional techniques and that also consumes fewer computing resources than conventional techniques. This improves over the prior art at least because existing systems lack such evaluative functionality and are generally unable to analyze such vast data sets accurately and efficiently while providing relevant, accurate outputs/responses.

Still further, the present disclosure includes specific features other than what is well-understood, routine, conventional activity in the field, or adding unconventional steps that demonstrate, in various embodiments, particular useful applications, e.g., querying, by the one or more processors, an external database to obtain a set of keywords, a set of topics, and a set of other queries that are pertinent to the initial query; embedding, by the one or more processors, articles from a knowledge database and articles from a curated database into a database of embedded articles; selecting, by the one or more processors, a set of embedded articles from the database of embedded articles, wherein each article in the set of embedded articles has a corresponding similarity score surpassing a threshold value when compared to the initial query using a text similarity metric; appending, by the one or more processors, (i) the set of keywords, the set of topics, and the set of other queries to the initial query to obtain an external data query and (ii) the set of embedded articles to the initial query to obtain an internal data query; generating, by the one or more processors, (i) an external output by applying a large language model (LLM) to the external data query and (ii) an internal output by applying a large language model to the internal data query; and/or combining, by the one or more processors, the internal output with the external output to obtain a combined output, among others.

Turning to the Figures, FIG. 1 depicts an example computing environment 100 for implementing various techniques associated with data curation and integration, in accordance with various embodiments described herein. The computing environment 100 includes a user computing device 102, a central server 104, an external server 108, a curated data source 110, and a network 120. Some embodiments may include a plurality of any of these components illustrated in FIG. 1, such as a plurality of user computing devices 102, a plurality of central servers 104, a plurality of external servers 108, and/or a plurality of curated data sources 110.

The user computing device 102 may generally receive input queries from a user and may transmit these queries to the central server 104 across the network 120. The input queries may include questions or comments associated with data that may be included, for example, in the knowledge database 107c, the curated database 107d, the embedding database 107e (also referenced herein as a "vector database"), the external database 109, and/or one or more curated data sources 110. In this manner, a user may utilize the user computing device 102 to access the central server 104 (and the external server 108 and/or the curated data source 110) in order to access the data and/or applications stored therein (e.g., query application 107, application data 106). The user computing device 102 may also receive responses (also referenced herein as "outputs") from the central server 104 and may display the responses for display to the user via a display (e.g., included as part of the I/O interface 102d).

The user computing device 102 includes a processor 102a, a memory 102b, a network interface controller (NIC) 102c, and an input/output (I/O) interface 102d. Generally speaking, the user computing device 102 may be an individual computing device, a group of multiple computing devices, an individual server, a group (e.g., cluster) of multiple servers, and/or another suitable type of computing device or system (e.g., a collection of computing resources). The I/O interface 102d may include any suitable device or devices for receiving input, such as one or more microphone, one or more camera, a hardware keyboard, a hardware mouse, a capacitive touch screen, etc. The I/O interface 102d may also include any suitable device for conveying output, such as a hardware speaker, a computer monitor, a touch screen, etc. In some cases, the I/O interface 102d may be a single input/output device, such as a touch screen device that accepts user input and displays output.

The central server 104 may receive input queries from the use computing device 102 and may generate responses to the queries using, for example, the query application 107. The query application 107 may generally be or include computer-executable instructions configured to receive input queries, determine keywords/topics and/or other relevant queries associated with the input queries, embed articles from various sources (e.g., knowledge database 107c, curated database 107d), select embedded articles (from the embedding database 107e) for appending to queries with the keywords/topics, and/or generate outputs in response to the queries. The query application 107 may perform each of these actions by executing and/or accessing one or more sub-components, such as the AI agent 107a, the AI models 107b, the knowledge database 107c, the curated database 107d, the embedding database 107e, and/or by accessing the application data 106, the external database 109, and/or the article data 111.

The central server 104 may include a processor 104a, a memory 104b, and an NIC 104c. The memory 104b may store the application data 106 and the query application 107, and in certain embodiments, the memory 104b may also store the external database 109. As described herein, the query application 107 may be an executable application configured to receive user queries and generate responses through the AI agent 107a and the AI models 107b, which access and utilize the knowledge database 107c, the curated database 107d, the embedding database 107e, the external server 108 (and the external database 109), and/or the curated data source 110 (and the article data 111).

The AI agent 107a generally is or may include a set of instructions configured to perform and/or otherwise orchestrate tasks associated with query response autonomously and/or assist users in various other ways. For example, the AI agent 107a may receive the user queries and facilitate actions included as part of the response generation process, including answering multiple successive user queries during live chat sessions. The AI agent 107a may incorporate/utilize multiple components, such as the AI models 107b, decision-making algorithms (not shown), the databases 107c-e, the external server 108, the curated data source 110, and/or other components to perform one or more of the response generation processes described herein.

The AI agent 107a may also include additional instructions that facilitate the response generation process described herein, such as a state machine component (not shown) configured to model and manage the states and transitions within the AI agent 107a, scraping instructions configured to cause the AI agent 107a to scrape data from one or more sources (e.g., external server 108), one or more application programming interfaces (APIs) that provide access to one or more functionalities (e.g., search engine results for scraping and analysis), and/or other suitable instructions or combinations thereof.

The AI models 107b generally include any artificial intelligence-based model configured to perform at least one action as part of the response generation process orchestrated by the AI agent 107a. These AI models 107b may include, for example, one or more large language models (LLMs), one or more retrieval-augmented generation (RAG) models, other retrieval models, and/or any other suitable models or combinations thereof. Additionally, the AI models 107b may include any suitable sets of instructions configured to perform/inform AI/ML techniques, such as chain of thought reasoning, multi-hop query generation, question and context summarization, model optimization via few-shot learning, and/or other suitable AI/ML techniques or combinations thereof.

As mentioned, the AI models 107b are generally configured to utilize artificial intelligence and/or machine learning techniques. For instance, the AI models 107b may be or include one or more LLMs configured to process and analyze input prompts (e.g., user queries, appended prompts from the AI agent 107a or other LLMs). The AI models 107b may employ supervised or unsupervised machine learning techniques, which may be followed or used in conjunction with reinforced or reinforcement learning techniques. In certain embodiments, the AI models 107b may generate audible or verbal output, text or textual output, visual or graphical output, output for use with speakers and/or display screens, and/or other types of output for user and/or other computer or bot consumption.

Noted above, in some embodiments, the AI models 107b or other computing devices may be configured to implement machine learning, such that the central server 104 "learns" to analyze, organize, and/or process data without being explicitly programmed. Machine learning may be implemented through machine learning methods and algorithms. In one exemplary embodiment, a machine learning module may be configured to implement machine learning methods and algorithms.

In some embodiments, at least one of a plurality of machine learning methods and algorithms may be applied, which may include but are not limited to: linear or logistic regression, instance-based algorithms, regularization algorithms, decision trees, Bayesian networks, naïve Bayes algorithms, cluster analysis, association rule learning, neural networks (e.g., convolutional neural networks, deep learning neural networks, combined learning module or program), deep learning, combined learning, reinforced learning, dimensionality reduction, support vector machines, k-nearest neighbor algorithms, random forest algorithms, gradient boosting algorithms, Bayesian program learning, voice recognition and synthesis algorithms, image or object recognition, optical character recognition, natural language processing (NLP), and/or other ML programs/algorithms either individually or in combination. In various embodiments, the implemented machine learning methods and algorithms are directed toward at least one of a plurality of categorizations of machine learning, such as supervised learning, unsupervised learning, and reinforcement learning.

In one embodiment, one or more of the AI models 107b employs supervised learning, which involves identifying patterns in existing data to make predictions about subsequently received data. Specifically, the one or more AI models 107b may be "trained" using training data, which includes example inputs and associated example outputs. Based upon the training data, the one or more AI models 107b may generate a predictive function which maps outputs to inputs and may utilize the predictive function to generate machine learning outputs based upon data inputs. The exemplary inputs and exemplary outputs of the training data may include any of the data inputs or machine learning outputs described above. In the exemplary embodiment, a processing element may be trained by providing it with a large sample of data with known characteristics or features.

For example, the one or more AI models 107b may be trained with historical responses output in response to historical user queries, along with subsequent conversation transcripts (e.g., entire chat session query/response histories), to train the one or more AI models 107b to generate responses or questions included as part of the responses that are predicted to direct the conversation in a manner that yields an optimal outcome (e.g., satisfied user, specific answer to nuanced issue, etc.).

In another embodiment, one or more of the AI models 107b may employ unsupervised learning, which involves finding meaningful relationships in unorganized data. Unlike supervised learning, unsupervised learning does not involve user-initiated training based upon example inputs with associated outputs. Rather, in unsupervised learning, the AI models 107b may organize unlabeled data according to a relationship determined by at least one machine learning method/algorithm employed by the AI models 107b. Unorganized data may include any combination of data inputs and/or machine learning outputs as described above.

In yet another embodiment, one or more of the AI models 107b may employ reinforcement learning, which involves optimizing outputs based upon feedback from a reward signal. Specifically, the AI models 107b may receive a user-defined reward signal definition, receive a data input, utilize a decision-making model to generate a machine learning output based upon the data input, receive a reward signal based upon the reward signal definition and the machine learning output, and alter the decision-making model so as to receive a stronger reward signal for subsequently generated machine learning outputs. Other types of machine learning may also be employed, including deep or combined learning techniques.

As an example, one or more of the AI models 107b may employ natural language processing (NLP) functions, which generally involves understanding verbal/written communications and generating responses to such communications. The AI models 107b may be trained to perform such NLP functionality using a symbolic method, machine learning models, and/or any other suitable training method. As an example, the AI models 107b may be trained to perform at least two techniques that may enable the AI models 107b to understand words spoken/written by a user: syntactic analysis and semantic analysis.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (POS) tagging, parsing, lemmatization and stemming, stop-word removal, and/or any other suitable sub-task or combinations thereof. For example, using syntactic analysis, the AI models 107b may generate textual transcriptions from verbal responses from a user in a data stream.

Semantic analysis generally involves analyzing text in order to understand and/or otherwise capture the meaning of the text. In particular, the AI models 107b applying semantic analysis may study the meaning of each individual word contained in a textual transcription in a process known as lexical semantics. Using these individual meanings, the AI models 107b may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the AI models 107b may generate one or more intent interpretations based upon one or more textual transcriptions from a syntactic analysis.

After training, machine learning programs (or information generated by such machine learning programs) may be used to evaluate additional data. Such data may be and/or may be related to knowledge base data, curated sources data, application data, and/or other data that was not included in the training dataset. The trained machine learning programs (or programs utilizing models, parameters, or other data produced through the training process) may accordingly be used for determining, assessing, analyzing, predicting, estimating, evaluating, or otherwise processing new data not included in the training dataset. Such trained machine learning programs may, therefore, be used to perform part or all of the analytical functions of the methods described elsewhere herein.

It is to be understood that supervised machine learning and/or unsupervised machine learning may also comprise retraining, relearning, or otherwise updating models with new, or different, information, which may include information received, ingested, generated, or otherwise used over time. Further, it should be appreciated that, as previously mentioned, the AI models 107b may be used to output a response to a user query as part of a chat session and/or any other values, responses, or combinations thereof using artificial intelligence (e.g., a machine learning model of the AI models 107b) or, in alternative aspects, without using artificial intelligence.

Moreover, although the methods described elsewhere herein may not directly mention machine learning techniques, such methods may be read to include such machine learning for any determination or processing of data that may be accomplished using such techniques. In some aspects, such machine learning techniques may be implemented automatically upon occurrence of certain events or upon certain conditions being met. In any event, use of machine learning techniques, as described herein, may begin with training a machine learning program, or such techniques may begin with a previously trained machine learning program.

The knowledge database 107c generally includes data extracted from and/or otherwise associated with one or more internal data sources (not shown). Such internal data sources may be, for example, articles, documents, memos, audio/video files, and/or other data files that are only circulated internally within a particular organization (e.g., within a company) and/or are otherwise unavailable to unauthorized users and are therefore not public information. For example, an internal data source may be an interaction system that tracks or logs the interactions members of an organization have with other individuals that are not part of the organization. As another example, an internal data source may be a set of organizational policies that are not publicized. The AI agent 107a may generally update the knowledge database 107c in response to determining that new/updated data has been uploaded to an internal data source. The AI agent 107a may also generate embeddings of the new/updated internal data and store the embeddings in the embedding database 107e.

The curated database 107d generally includes data extracted from and/or otherwise associated with one or more curated data sources (e.g., curated data source 110) that are connected to the central server 104 via the network 120. Such curated data sources may be, for example, trusted news sources, publications, journals, and/or any other external data source that is trusted by the organization managing the central server 104. Thus, the curated data (e.g., article data 111) extracted from and/or otherwise associated with the curated data sources may generally be from articles, documents, audio/video files, and/or other data files that are maintained in a storage location (e.g., a news source website) that is separate from the query application 107.

The query application 107 may periodically, and/or in direct response from a user query, update the curated database 107d by searching one or more of the curated data sources 110 for updated data (e.g., article data 111) that is associated with one or more topics. For example, the query application 107 may include instructions that cause the AI agent 107a to search the one or more curated data sources 110 every week to determine whether any new articles or other entries have been uploaded. In response to determining that one or more new articles/entries have been uploaded, the application 107 may analyze the articles/entries to extract data and/or generate one or more embeddings of the articles/entries for storage in the curated database 107d and/or the embedding database 107e, respectively.

The embedding database 107e generally stores embeddings of data received at the central server 104 and processed by the query application 107. For example, the server 104 may receive a user query from the user computing device 102 that causes the query application 107 to query an external source (e.g., external server 108, curated data source 110) and receive relevant data (e.g., article data 111). The AI agent 107a may include and execute an encoder (not shown) configured to generate embeddings of the received data, and the agent 107a may further store these embeddings of the received data in the embedding database 107e. The AI agent 107a may thereafter analyze the embeddings of the content related to data stored and/or otherwise referenced in any of the knowledge database 107c, the curated database 107d, and/or the external database 109.

The application data 106 may generally be or include any data associated with the query application 107, such as articles, extracted text/images/audio, user queries, responses, training data used to train/re-train any of the AI models 107*b*, metadata, and/or any of data that is also included in the databases 107*c*, 107*d*, 107*e*. For example, the query application 107 may participate in a chat session with a user (e.g., using user computing device 102), during which, multiple user queries and responses are transmitted between the central server 104 and the device 102. The query application 107 may store each user query and response output by the application 107 in the application data 106 to track the progression and outcome of the chat session. If the query application 107 (e.g., via AI agent 107*a*) determines that the outcome of the chat session indicates one or more AI models 107*b* should be updated and/or re-trained, the AI agent 107*a* may access the application data 106 to retrieve the chat session history (e.g., each user query and subsequent response output by the application 107) and use the chat session history to update/re-train the one or more AI models 107*b*. If, for example, a user query received at the application 107 indicates a prior response output by the application 107 was incorrect and/or otherwise erroneous, the AI agent 107*a* may retrieve and/or otherwise utilize the incorrect/erroneous prior response to (1) evaluate which AI model(s) 107*b* are responsible for the error(s) and should be updated/re-trained and (2) update/re-train the responsible AI model(s) 107*b*.

The external server 108 may be a server and/or other computing device that the central server 104 accesses to retrieve external data that is not internal (e.g., included in the knowledge database 107*c*) and/or from a curated data source 110 (e.g., and stored in the curated database 107*d*). In certain embodiments, the external server 108 may generally represent a search engine service configured to provide topics, keywords, related questions, and/or other trends that may be associated with the user query. For example, the external server 108 may be associated with an API interface configured to receive requests from the central server 104 and return the topics, keywords, related questions and/or other trends associated with the user query. The keywords, topics, related queries, and/or other topics may be stored and/or otherwise available from the external database 109 and/or may be retrieved and transmitted to the central server 104 via the API interface. Accordingly, the external server 108 may be a free-source data repository that includes the external database 109 for open access across the network 120.

The curated data source 110 may be, as previously mentioned, a trusted source of information that the central server 104 may access to search for and retrieve relevant information corresponding to a received user query. These curated data sources 110 may generally represent data sources with information that users who have access to the system/network to submit user queries (e.g., to the central server 104) may generally benefit from receiving as part of their responses from the server 104. The curated data source 110 may be a website associated with, for example, a news outlet, a scientific publication, a social media platform, and/or any other suitable website or combinations thereof.

More generally, the processors 102*a*, 104*a* may include any suitable number of processors and/or processor types, such as CPUs and one or more graphics processing units (GPUs). The processors 102*a*, 104*a* may be connected to the one or more memories 102*b*, 104*b* via a computer bus responsible for transmitting electronic data, data packets, or otherwise electronic signals to and from the processors 102*a*, 104*a* and the one or more memories 102*b*, 104*b* in order to implement, execute, and/or otherwise perform the machine readable (software) instructions, methods, processes, elements or limitations, as illustrated, depicted, or described for the various flowcharts, illustrations, diagrams, figures, and/or other disclosure herein.

The processors 102*a*, 104*a* may interface with the one or more memories 102*b*, 104*b* via the computer bus to execute an operating system (OS). The processors 102*a*, 104*a* may also interface with the one or more memories 102*b*, 104*b* via the computer bus to create, read, update, delete, or otherwise access or interact with the data stored in the one or more memories 102*b*, 104*b*. The data stored in the one or more memories 102*b*, 104*b* may include all or part of any of the data or information described herein, including, for example, the query application 107, the AI agent 107*a*, the AI models 107*b*, the knowledge database 107*c*, the curated database 107*d*, the embedding database 107*e*, the application data 106, and/or any other data stored in the one or more memories 102*b*, 104*b*. The memories 102*b*, 104*b* may include one or more persistent memories (e.g., a hard drive/solid state memory) and stores one or more set of computer executable instructions/modules, including the query application 107, the AI agent 107*a*, the AI models 107*b*, the knowledge database 107*c*, the curated database 107*d*, and/or the embedding database 107*e*.

In general, a computer program or computer based product, application, or code (e.g., the query application 107, the AI agent 107*a*, the AI models 107*b*, the knowledge database 107*c*, the curated database 107*d*, the embedding database 107*e*, the application data 106, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 102*a*, 104*a* (e.g., working in connection with the data in the one or more memories 102*b*, 104*b*) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

As mentioned, the one or more memories 102*b*, 104*b* may include one or more forms of non-transitory, volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In certain aspects, the one or more memories 102*b*, 104*b* may store an operating system (OS) (e.g., Microsoft Windows, Linux, Unix, etc.) capable of facilitating the functionalities, applications, methods, or other software as discussed herein.

The one or more memories 102*b*, 104*b* may also store the query application 107, the AI agent 107*a*, the AI models 107*b*, the knowledge database 107*c*, the curated database 107*d*, the embedding database 107*e*, the application data 106, as well as other data (not shown), including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, or otherwise be part of the query application 107, the AI agent 107a, the AI models 107b, the knowledge database 107c, the curated database 107d, the embedding database 107e, and/or the application data 106, where each may be configured to facilitate their various functionalities discussed herein. It should be appreciated that one or more other applications may be envisioned and that are executed by the processor(s) 102a, 104a.

The NICs 102c, 104c may include any suitable network interface controller(s), such as wired/wireless controllers (e.g., Ethernet controllers), and facilitate bidirectional/multiplexed networking over the network 120 between the user computing device 102 and other components of the environment 100 (e.g., central server 104, the external server 108, etc.). The NICs 102c, 104c may be configured to communicate (e.g., send and receive) data via one or more external/network port(s) to one or more networks or local terminals, such as a computer network and/or user computing devices (e.g., user computing device 102, central server 104), as described herein.

In some embodiments, the user computing device 102, central server 104, the external server 108, and/or the curated data source 110 may include a client-server platform technology such as ASP.NET, Java J2EE, Ruby on Rails, Node.js, a web service or online API, responsive for receiving and responding to electronic requests. The user computing device 102, central server 104, the external server 108, and/or the curated data source 110 may implement the client-server platform technology that may interact, via the computer bus, with the one or more memories 102b, 104b (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the user computing device 102, central server 104, the external server 108, and/or the curated data source 110 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network. The network 120 may be a single communication network or may include multiple communication networks of one or more types (e.g., one or more wired and/or wireless local area networks (LANs), and/or one or more wired and/or wireless wide area networks (WANs) such as the Internet). The network 120 may enable bidirectional communication between the central server 104, the user computing device 102, the external server 108, the curated data source 110, and/or between multiple central servers 104, for example.

The user computing device 102, central server 104, the external server 108, and/or the curated data source 110 may further include or implement an operator interface configured to present information to an administrator or operator and/or receive inputs from the administrator or operator. For example, an operator interface may provide a display screen (e.g., via user computing device 102). The user computing device 102, central server 104, the external server 108, and/or the curated data source 110 may also provide I/O components (e.g., ports, capacitive or resistive touch sensitive input panels, keys, buttons, lights, LEDs), which may be directly accessible via or attached to the user computing device 102 (e.g., via I/O interface 102d), central server 104, the external server 108, and/or the curated data source 110 or may be indirectly accessible via or attached to an internal user computing device (e.g., 102). According to some embodiments, an administrator or operator may access the user computing device 102, central server 104, the external server 108, and/or the curated data source 110 to review information (e.g., source references included in a query response), make changes, input secure file share requests, and/or perform other functions.

As described above herein, in some embodiments, the user computing device 102, central server 104, the external server 108, the curated data source 110, and/or any other components, devices, or system described herein may perform the functionalities as discussed herein as part of a "cloud" network or may otherwise communicate with other hardware or software components within the cloud to send, retrieve, or otherwise analyze data or information described herein. For example, the user computing device 102, the central server 104, the external server 108, and/or the curated data source 110 may store article data, embedded article data, internal data, external data, and/or any other data in local storage (e.g., one or more memories 102b, 104b) and/or in a cloud storage service.

Figure 2A:
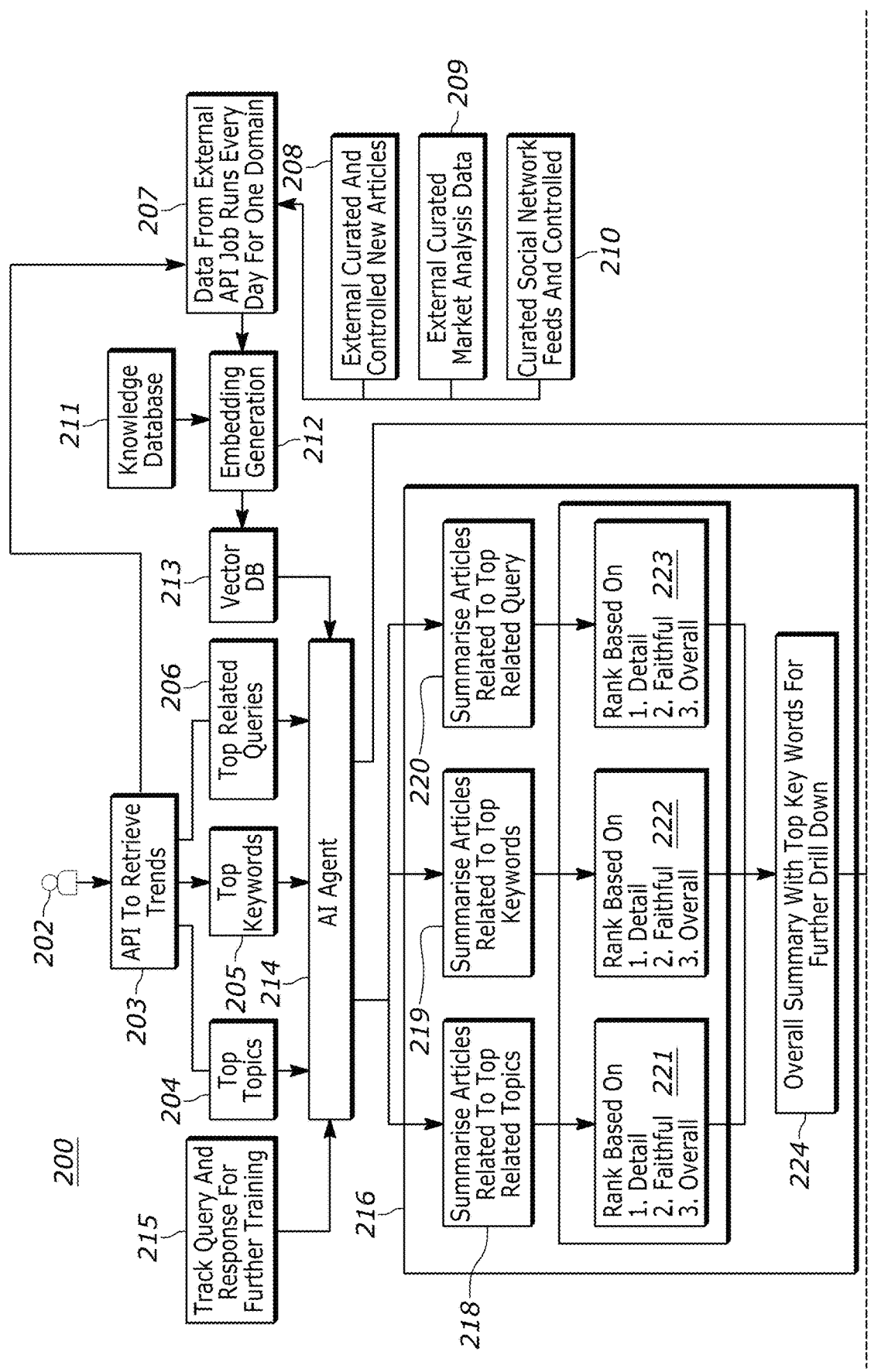
FIG. 2A illustrates an example high-level flow diagram of a chat session, in accordance with various embodiments described herein.
Figure 2A:
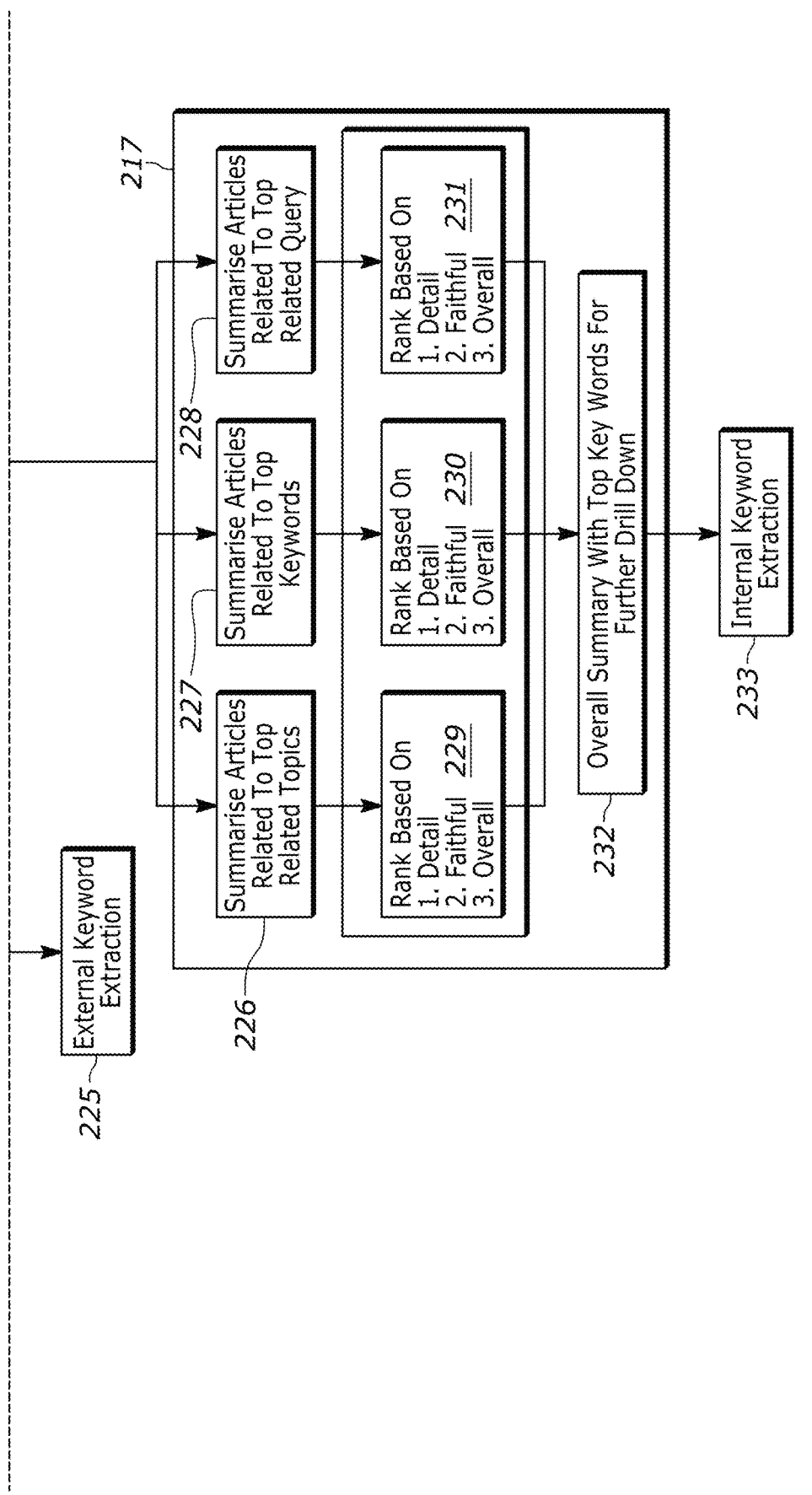

FIG. 2A illustrates an example high-level flow diagram of a chat session 200, in accordance with various embodiments described herein. The chat session 200 generally includes a user 202 submitting a user query (e.g., an initial query) to the response generation systems described herein, which analyze the user query, retrieve relevant information from various sources, generate embeddings of such information, utilize the most relevant information (e.g., as indicated by similarities of the embeddings) to generate prompts, and/or summarize/rank the information included as part of the outputs. In this manner, the chat session 200 provides the user 202 with highly relevant outputs with data pulled/scraped from a wide variety of sources, including private (e.g., internal) sources, to create a nuanced chat session 200.

When the user 202 submits their query, the systems described herein (e.g., central server 104) receives the query and begins analyzing the query to determine information that may be used to enhance the query. The systems described herein may utilize APIs 203 configured to retrieve relevant data, such as top related topics 204, top related keywords 205, and/or top related queries 206 that may be contextually/semantically similar to the user query. For example, the APIs 203 may leverage one or more search engines to retrieve the top topics 204, keywords 205, and/or related queries 206, where other users engaging with the search engine(s) may use such topics, keywords, or related queries and/or may receive them as part of their search results (e.g., when using identical language as the user query). As one example, the APIs 203 may include Google Trends (or similar APIs/services), which may process the user query to determine its relevance to current search trends and patterns and generate the top topics 204 and top keywords 205 that are closely associated with the query based on search volume, geographic location, and/or temporal factors. In this example, the API 203 may identify related queries that other users have searched for in connection with the initial query, offering insights into similar or emerging interests.

The user query, the top topics 204, top keywords 205, top related queries 206, and/or any other contextual information may also be utilized by one or more other APIs 207 to retrieve information/data from one or more other external sources (e.g., curated data sources). For example, the APIs 207 may search and pull/scrape data from curated/controlled new articles 208, curated market analysis data 209, curated/controlled social network feeds 210, and/or any other suitable curated data source (e.g., curated data sources 110). The curated/controlled new articles 208 may represent articles published on a trusted website (e.g., news media, publications) and/or from a controlled source (e.g., internal to the entity operating/controlling the query response systems). The curated market analysis data 209 may be data targeted at one or more industries/markets, and/or may reflect larger market data, and may also be from a trusted website (e.g., news media, publications) and/or from a controlled source (e.g., internal to the entity operating/controlling the query response systems). The curated/controlled social network feeds 210 may be data contained on one or more social media platforms that may generally be relevant to the entity that controls the query response systems and/or may be controlled by the entity. Any of this data may be stored in a curated database (e.g., curated database 107d). In certain embodiments, the APIs 207 may iteratively pull/scrape data from these sources (e.g., on a daily, hourly, weekly basis, etc.) to continually incorporate the most up-to-date information for any topic/domain of interest.

The systems described herein may then pull this curated/controlled information, along with data/information from the knowledge database 211, into an encoder configured to generate embeddings 212 of each article or piece of data/information. Generally, the encoder may generate embeddings 212 representing the entire article, but it should be appreciated that the encoder may operate in tandem with another component (e.g., a preprocessor (not shown)) configured to chunk/segment the article(s) into smaller sized chunks/segments that are compatible with any input size limitations the encoder may have prior to generating the embeddings 212. The preprocessor may be responsible for preparing the articles for the encoder by performing various tasks such as tokenization, normalization, and/or segmentation. When generated 212, the encoder may transmit the embeddings to the vector database 213 (e.g., embedding database 107e) for storage and subsequent searching/retrieval by the AI agent 214.

The AI agent 214 may generally be configured to receive data and/or search/retrieve data and orchestrate the response generation process using the data. The AI agent 214 may receive the top topics 204, the top keywords 205, the top related queries 206, and search the vector database 213 to retrieve relevant article embeddings for appending to prompts used as inputs to one or more LLMs. The AI agent 214 may generally utilize one or more AI/ML models (e.g., AI models 107b), such as a RAG model configured to perform the data retrieval of the top topics 204, the top keywords 205, the top related queries 206, and/or the article embeddings from the vector database 213.

Broadly, the AI agent 214 may utilize RAG model(s) to understand the context/topic of interest within the user's request and generate prompts that accurately reflect this context, for example, leveraging declarative self-improving (DSPY) LLM prompt programming techniques. In this manner, the AI agent 214 ensures that the prompt is well-formed and likely to elicit a relevant response from the LLM. The AI agent 214 may also use, for example, LLaMaindex and/or any other suitable tool(s) configured to index and search large datasets (e.g., external database 109, vector database 213) to find articles relevant to the generated prompts and/or user queries. As an example, the AI agent 214 may query the vector database 213 using keywords or topics extracted from the user query, ensuring that the articles retrieved are pertinent to the user's request. The AI agent 214 may perform similarity analysis on the embeddings to embeddings generated of the keywords, topics, etc. to determine similarity values using any suitable similarity metric (e.g., cosine similarity, Jaccard distance, Euclidean norm, etc.).

When the AI agent 214 retrieves the relevant articles, the agent 214 may refine the initial user query based on the content of these articles, e.g., by appending portions of the articles to the user query. This refinement process ensures that the prompt is as specific and informative as possible, increasing the likelihood of the LLMs 216, 217 generating insightful summaries for responses. The AI agent 214 may then input the refined prompt, along with context from the retrieved articles, into the LLMs 216, 217 to generate responses. The LLMs 216, 217 generally process the input prompts and generate summaries/rankings of the relevant articles and/or information contained therein to produce coherent and concise summaries for responses to the user query. For example, the LLMs 216, 217 may be or utilize Mistral AI, GPT-4, Pytorch for deep learning computations, and/or any other suitable AI/ML framework or models.

More specifically, the LLM 216 may receive inputs associated with external data, such as the data retrieved from a search engine using the APIs 203. The LLM 216 may first summarize each of the articles related to the top related topics 218, top keywords 219, and the top related queries 220 associated with the input prompt(s). The LLM 216 may then rank each of these article summaries based on, for example, their respective detail concerning the topic of interest, their respective faithfulness/adherence/relevance to the topic of interest, and/or their overall applicability to the topic of interest. The LLM 216 may perform this ranking for each of the top related topics article summaries 221, the top keyword article summaries 222, and/or the top related query article summaries 223. The LLM 216 may then generate an overall summary 224 of the ranked summaries by combining the results from each of the rankings 221, 222, and 223. This overall summary 224 may further include top keywords that are related to the topic of interest that the LLM 216 may flag for storage in working memory to enable subsequent analysis and/or retrieval of data associated with these additional topics.

In particular, each of the top keywords included and/or otherwise indicated in the overall summary 224 may be extracted by the external keyword extractor 225 and stored and/or otherwise referenced by the AI agent 214 to facilitate additional prompts/responses as part of the chat session. For example, if a topic of interest indicated in the user query is a particular individual the user is meeting, the top keywords may indicate a particular hobby (e.g., basketball) that the individual enjoys. Thus, the external keyword extractor 225 may recognize the keywords associated with this hobby and may enable the AI agent 214 to, for example, include additional queries in the response related to the hobby, proactively search/retrieve information from external/internal/curated sources related to the hobby, and/or otherwise incorporate the hobby in the context used to inform the AI models, such as in a prompt to the LLM 216.

The LLM 217 may receive inputs associated with internal data, such as the data retrieved from the curated data sources (e.g., 208-210) and the knowledge database 211. The LLM 217 may first summarize each of the articles related to the top related topics 226, top keywords 227, and the top related queries 228 associated with the input prompt(s). The LLM 217 may then rank each of these article summaries based on, for example, their respective detail concerning the topic of interest, their respective faithfulness/adherence/relevance to the topic of interest, and/or their overall applicability to the topic of interest. The LLM 217 may perform this ranking for each of the top related topics article summaries 229, the top keyword article summaries 230, and/or the top related query article summaries 231. The LLM 217 may then generate an overall summary 232 of the ranked summaries by combining the results from each of the rankings 229, 230, and 231. This overall summary 232 may further include top keywords that are related to the topic of interest that the LLM 217 may flag for storage in working memory to enable subsequent analysis and/or retrieval of data associated with these additional topics.

In particular, each of the top keywords included and/or otherwise indicated in the overall summary 232 may be extracted by the external keyword extractor 233 and stored and/or otherwise referenced by the AI agent 214 to facilitate additional prompts/responses as part of the chat session. For example, if a topic of interest indicated in the user query is a topic (e.g., renewable energy) in which the user is interested, the top keywords may indicate a particular sub-topic (e.g., solar power) that is particularly active/relevant at the time the AI agent 214 receives the user query. Thus, the external keyword extractor 233 may recognize the keywords associated with this sub-topic and may enable the AI agent 214 to, for example, include additional queries in the response related to the sub-topic, proactively search/retrieve information from external/internal/curated sources related to the sub-topic, and/or otherwise incorporate the sub-topic in the context used to inform the AI models, such as in a prompt to the LLM 217.

Figure 2B:
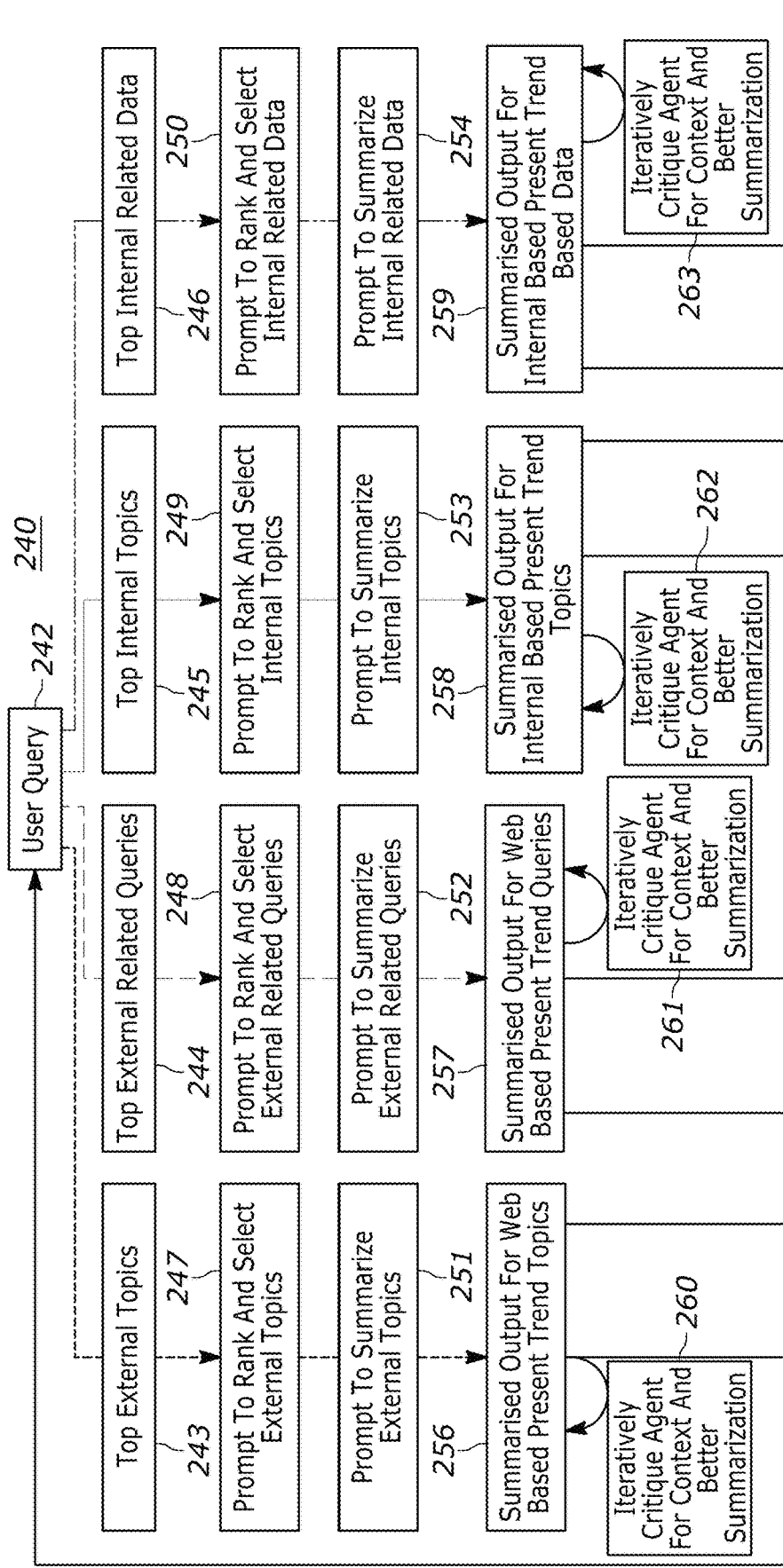
FIG. 2B illustrates another example high-level flow diagram of a chat session, in accordance with various embodiments described herein.
Figure 2B:
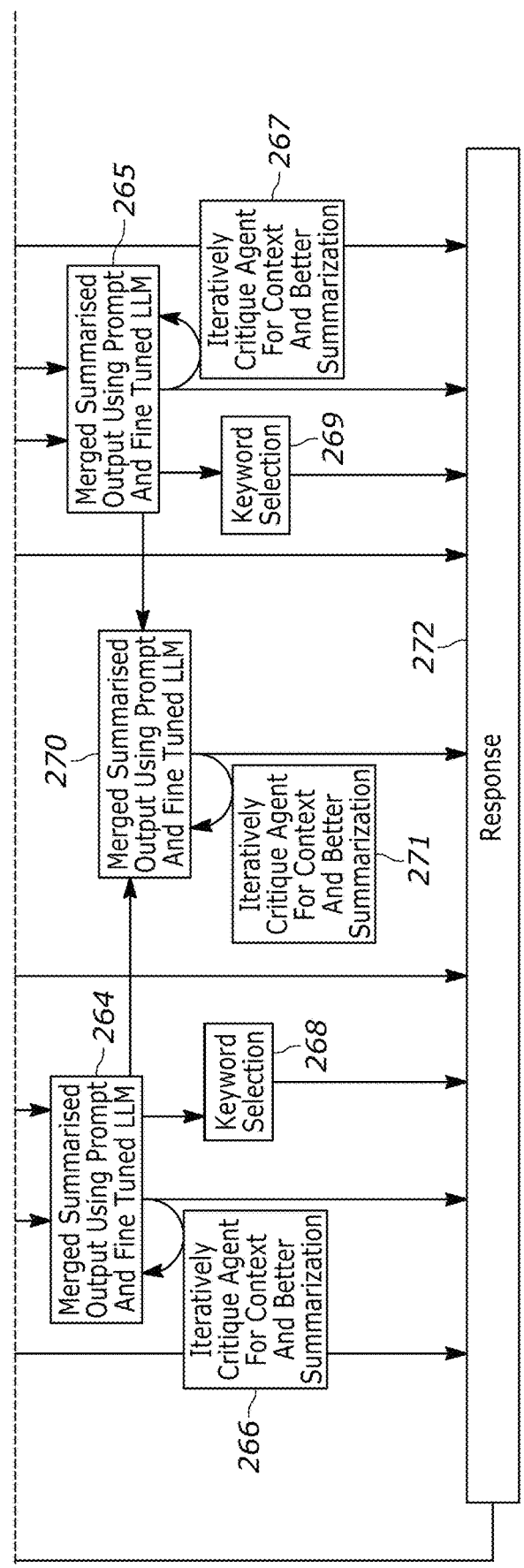

FIG. 2B illustrates another example high-level flow diagram of a chat session 240, in accordance with various embodiments described herein. The chat session 240 is generally similar to the chat session 200 of FIG. 2A and may include many similar/identical functionalities as the chat session 200. For example, the chat session 240 may include a user providing a user query 242, that the systems described herein receive and analyze. Namely, the systems described herein may search for and retrieve the top external topics 243, the top external related queries 244, the top internal topics 245, and/or the top internal related data 246 associated with the user query 242.

The top external topics 243 and the top external related queries 244 may be topics and/or related queries that are received from an external data source, such as via the APIs 203 of FIG. 2A. For example, the top external topics 243 and the top external related queries 244 may represent the top trending topics/related queries that are input into a search engine as of the time when the user query 242 is received by the systems described herein.

The top internal topics 245 and the top internal related data 246 may be topics and/or related data that is retrieved by the system from trusted (curated) data sources (e.g., curated data source 110, curated database 107d) and/or otherwise stored in an internal database (e.g., knowledge database 107c) of internal information/data. The system may determine the top internal topics 245 and/or the top internal related data 246 via similarity scores/values of embeddings representing the user query 242 and the internal data stored in an embedding database (e.g., embedding database 107e).

The chat session 240 further includes generating prompts to rank and select the most relevant topics/queries. The systems described herein (e.g., AI agent 107a, AI models 107b) may receive the topics 243, 245, the queries 244, and the data 246, and may generate prompts 247, 248, 249, and 250 that include a portion or all of this data/information and indicate to an LLM that the data should be ranked and selected based on, e.g., detail, faithfulness, overall applicability, and/or any other suitable criteria or combinations thereof. The systems described herein may also generate prompts 251, 252, 253, and 254 indicating that the LLMs should summarize each of the most relevant data/information.

With these prompts, the LLMs (e.g., LLMs 216, 217) may proceed to evaluate the data/information and summarize each specific set of topics/data at blocks 256, 257, 258, and 259. As part of this summarization, the systems described herein may also enforce iterative improvements to the outputs of the LLMs through critique and contextual improvements. The systems described herein may analyze the initial outputs (represented by blocks 256-259) of the LLMs and may critique these outputs to determine where and how the LLMs may improve their description/summarization of a concept/topic and may incorporate additional context to aid the LLMs in providing more accurate, relevant, and/or otherwise improved outputs. The systems described herein may iteratively critique and incorporate additional context over multiple iterations (e.g., 2, 3, 5, 10 iterations) to improve the LLM outputs.

For example, the systems described herein may utilize a chain of thought (CoT) analytical approach in combination with the reasoning and acting with chain of thought (ReAct) technique framework. The CoT approach generally involves prompting the LLMs to generate intermediate reasoning steps or "thoughts" before arriving at a final answer or conclusion. This method encourages the LLMs to break down complex problems (e.g., ranking/summarizing topic/data relevancy) into smaller, more manageable parts, and to explicitly articulate the reasoning process that leads to the solution. By doing so, CoT improves the LLMs' problem-solving capabilities and the transparency of its decision-making process.

Similarly, ReAct is a technique that can be used to refine the responses of LLMs by incorporating feedback or reactions into the model's training or inference process. This approach may generally involve re-prompting the LLM with adjusted or additional context (e.g., additional topics/data from one or more databases/sources) based on its initial response, or using feedback loops where the model's output is critiqued or corrected, and the model is prompted to consider this feedback in generating a revised response. Thus, by employing ReAct the systems described herein generally make the LLMs more adaptable and responsive to feedback, thereby enhancing the accuracy and relevance of their outputs.

When this iterative critique and context updating is completed, the systems described herein (e.g., AI agent 107a) may generate another prompt for the LLMs to merge these summarized outputs. In particular, the AI agent may generate and input prompts (along with the outputs 256-259) into the LLMs that instruct the LLMs to merge the summarized external topics/related queries outputs 256, 257 (represented by block 264) and to separately merge the summarized internal topics/related data outputs 258, 259 (represented by block 265). The systems described herein may then again iteratively critique and incorporate additional context into each of these merged, summarized outputs 264, 265, as represented by blocks 266 and 267, respectively.

The systems described herein may then merge the two merged, summarized outputs 264, 265 into an overall, merged summary output 270 and may iteratively critique and incorporate additional context (represented by block 271) for the LLMs to reach the output 270, as described herein. Moreover, the systems described herein may also extract the keywords associated with each merged, summarized output 264, 265, as represented by blocks 268 and 269, respectively. Each of the extracted keywords 268, 269 and the overall, merged summary output 270 may be incorporated into a response 272 that is subsequently transmitted and/or otherwise displayed to the user, which may influence the user's subsequent user query.

Figure 3A:
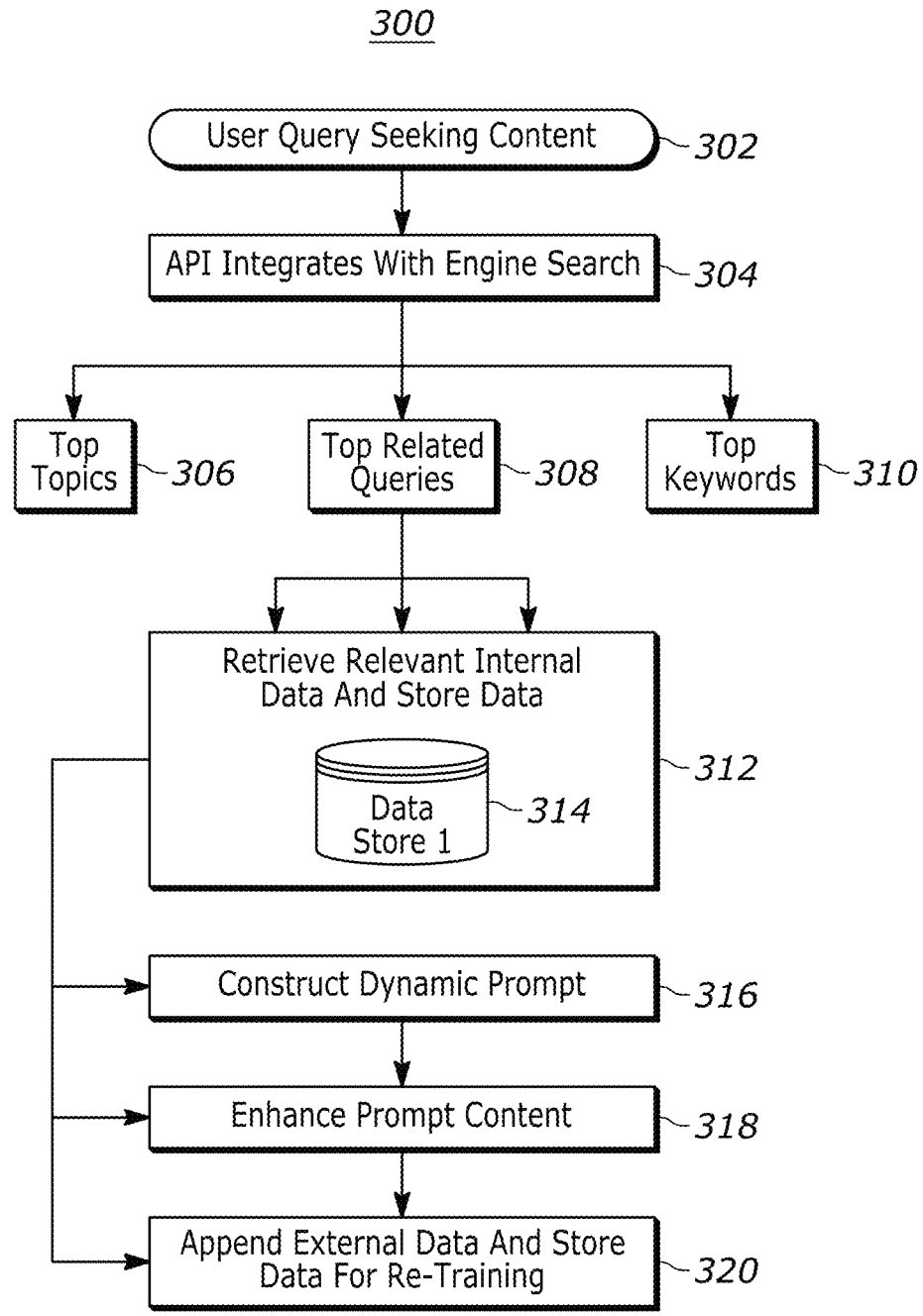
FIG. 3A illustrates a first example online process portion of the present techniques, in accordance with various embodiments described herein.

FIG. 3A illustrates a first example online process portion 300 of the present techniques, in accordance with various embodiments described herein. The first example online process portion 300 generally represents various external data scraping and dynamic prompt generation actions using the external data the systems described herein may perform to prompt LLMs to generate responses to user queries. The first example online process portion 300 includes a user submitting a user query 302 and an API 304 receiving the user query 302 to return relevant data associated with the user query 302. The API 304 may enable the system to receive the search results, which may include one or more top topics 306, one or more top related queries 308, and/or one or more top keywords 310 that are associated with the user query 302.

The systems described herein may further leverage the top related queries 308 to search through internal databases (e.g., curated database 107d, knowledge database 107c) to retrieve additional relevant data corresponding to the user query 302 (block 312). The additional data retrieved by the systems described herein may be stored in a first data storage location 314, which may generally be associated with one or more of the databases described herein. Further, the systems described herein may retrieve relevant data from an embeddings database (e.g., embedding database 107e) where embeddings of the internal data are stored for reference (e.g., similarity comparisons) with the top related queries 308.

The systems described herein may further construct dynamic prompts 316 using the retrieved data at block 312, as well as the top topics 306, the top related queries 308, and the top keywords 310. For example, the AI agent orchestrating the prompt generation may receive the user query 302 and may generate an initial dynamic prompt 316 for input into an LLM. At block 318, the systems described herein may enhance the prompt content by, for example, utilizing a RAG model and/or LLM models to append the relevant internal data from block 312 to the prompt and/or otherwise incorporating additional data/context into the dynamic prompt 316 from any suitable source (e.g., internal, external). At block 318, the systems described herein may further enhance the dynamic prompt 316 by, for example, utilizing a RAG model and/or LLM models to append the top topics 306, the top related queries 308, and/or the top keywords 310 to the dynamic prompt 316 and/or otherwise incorporate additional data/context into the dynamic prompt 316 from any suitable source (e.g., internal, external).

Figure 3B:
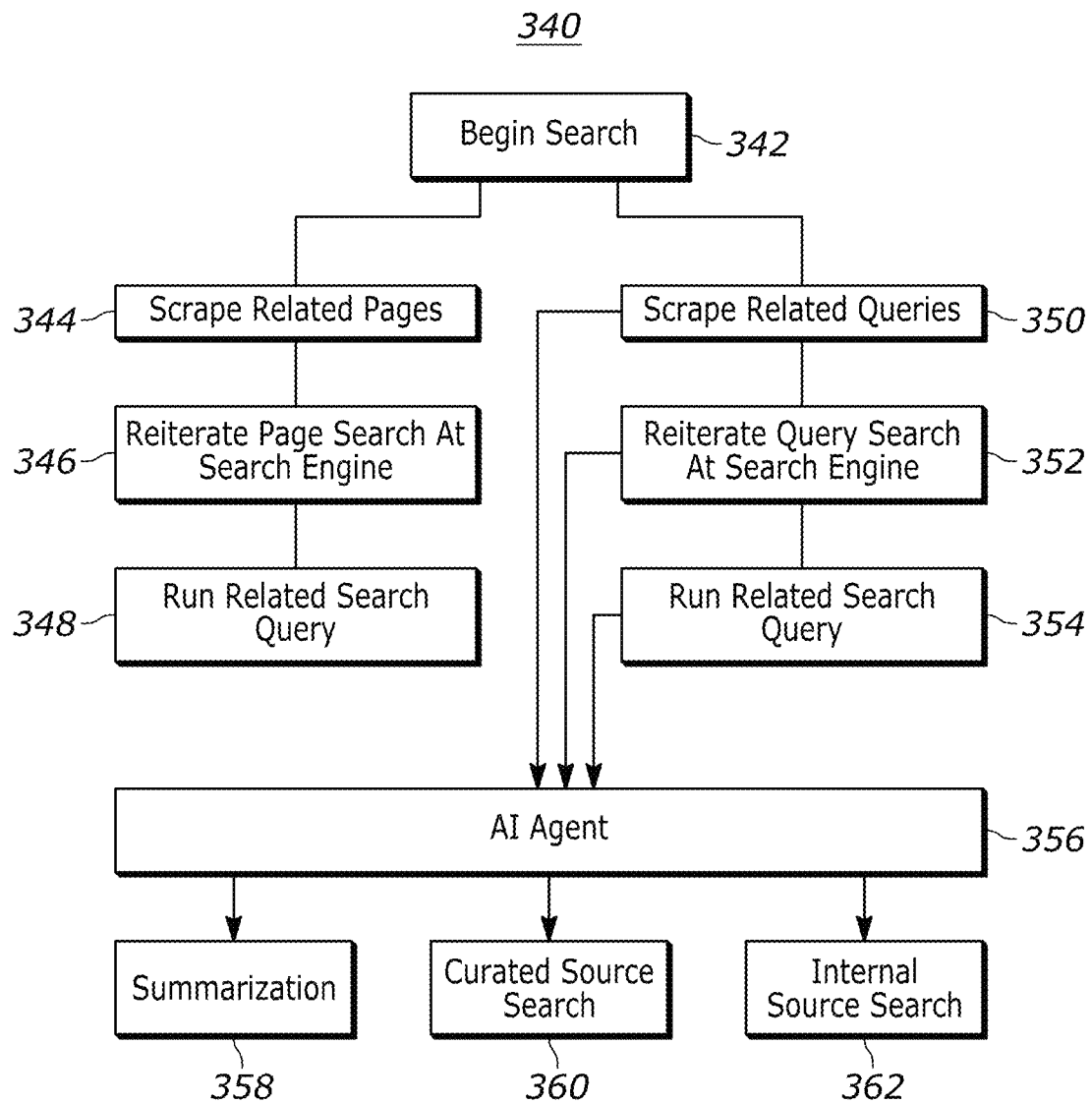
FIG. 3B illustrates an example query enhancement search as part of the first example online process portion of FIG. 3A to retrieve curated data for appending to an initial query, in accordance with various embodiments described herein.

FIG. 3B illustrates an example query enhancement search 340 as part of the first example online process portion 300 of FIG. 3A to retrieve curated data for appending to an initial query, in accordance with various embodiments described herein. The example query enhancement search 340 includes initiating the search by receiving the user query (block 342). At block 344, the example query enhancement search 340 includes scraping top related pages/topics associated with the user query. At block 346, the example query enhancement search 340 includes reiterating the page/topic search at the search engine based on updated/enhanced search terms.

Generally, the AI agent and/or other suitable components or combinations thereof may utilize LLMs and/or other suitable models (e.g., AI models 107b) to generate the search prompts utilized as part of the example query enhancement search 340. For example, the AI agent may access the search engine (via an API) or other suitable tool to receive the contemporary trend results (e.g., top topics, related queries, keywords), and may first forward the user query to the search engine system. In this example, the user query may indicate that the topic of interest is oil/natural gas production, and the initial search through the search engine trends may indicate a list of top pages/topics that includes "Gas Company X", "Natural Resources", "Saudi Arabia", and/or other similar topics. At block 346, the AI agent may receive the initial list of top topics/pages and may utilize an AI model to enhance the search query to cause the search engine system to search and scrape the topic/page results for "Gas Company X+Natural Resources", "Gas Company X+Saudi Arabia", and/or other similar search queries that build on the initial search results.

At block 348, the AI agent and/or other suitable components or combinations thereof may run a related search query to determine other common search queries that are related to the topic/pages of interest, as may be determined by the results of the prior searches at blocks 344 and/or 346. As an example, the related search query many include a request to search for topics individuals also searched for that are related to "Gas Company X buying Company Y", "Why Gas Company X buying Company Y", and the like that builds on the initial search results and/or the results from block 346. As part of any of these search queries, the systems described herein may include examples of the pages (e.g., web addresses) the systems expect to receive in response. As a result of these topic/page searches, represented by blocks 344, 346, and 348, the systems described herein may receive multiple related topics to the topic of interest indicated in the initial user query.

The example query enhancement search 340 further includes scraping related queries that are relevant to the user query (block 350). Continuing the prior example, the systems described herein may provide an initial search query that indicates searching for related queries to the user query, which may return similar queries as "Gas Company X stock forecast 2025", "Gas Company X Credit Card", "Gas Company A", "Gas Company B", and/or other similar queries. At block 352, the AI agent may receive the initial list of top related queries and may utilize an AI model to enhance the search query to cause the search engine system to search and scrape the topic/page results for "Gas Company X+Gas Company X stock forecast 2025", "Gas Company X+Gas Company X Credit Card", "Gas Company X+Gas Company A", and/or other similar search queries that build on the initial search results.

At block 354, the AI agent and/or other suitable components or combinations thereof may run a related search query to determine other common search queries that are related to the topic/pages of interest, as may be determined by the results of the prior searches at blocks 350 and/or 352. As an example, the related search query many include a request to search for topics individuals also searched for that are related to "What credit score is needed for a Gas Company X card?" and/or similar topics that other individuals may have searched for and that may build on the initial search results and/or the results from block 352. As part of any of these search queries, the systems described herein may include examples of the pages (e.g., web addresses) the systems expect to receive in response. As a result of these topic/page searches, represented by blocks 350, 352, and 354, the systems described herein may receive multiple related queries to the topic of interest indicated in the initial user query.

The AI agent 356 may receive the results from the searches 350, 352, and 354 and/or any of the other searches 344, 346, and/or 348 to generate summarized external results 358 and perform a curated source search 360 and an internal source search 362. Each of these outputs and/or actions performed by the AI agent 356 (e.g., results 358 and searches 360, 362) may be used as and/or inform subsequent inputs to an LLM to, for example, generate summarized and ranked external source data and/or internal/curated source data that is relevant to the user query.

Figure 4:
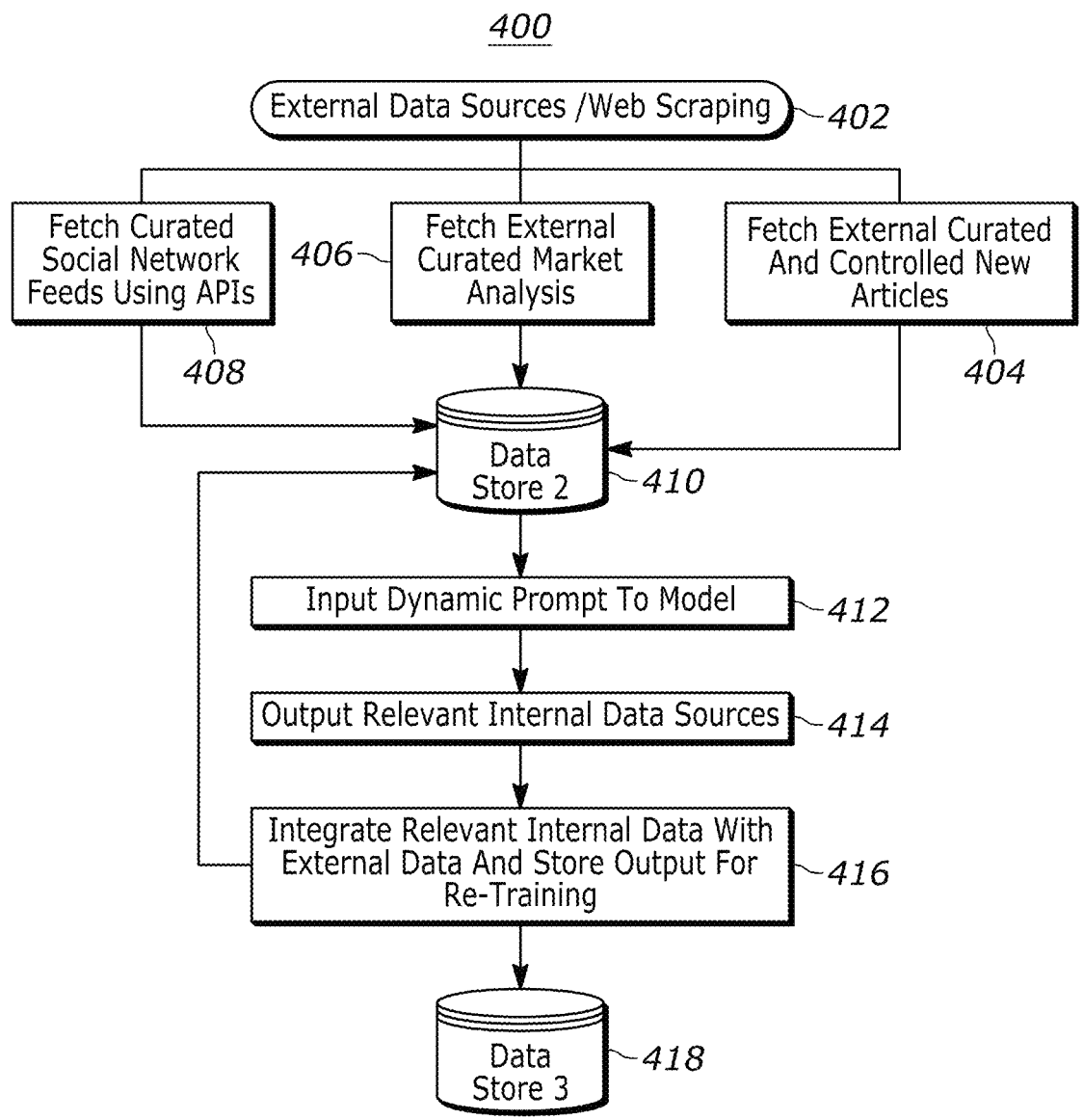
FIG. 4 illustrates a first example offline process portion of the present techniques, in accordance with various embodiments described herein.

FIG. 4 illustrates a first example offline process portion 400 of the present techniques, in accordance with various embodiments described herein. The first example offline process portion 400 may generally be a process that at least partially takes place offline, such that one or more of the actions included in the portion 400 may not involve resources that are connected to the network and/or may not take place during a live chat session.

The first example offline process portion 400 includes one or more components of the systems described herein accessing and scraping one or more external data sources 402. As a result, the first example offline process portion 400 may further include the systems described herein fetching external curated/controlled new articles 404, external curated market analysis 406, and/or curated social network feeds 408. One or more of the fetched data 404, 406, 408 may include data obtained, e.g., via an API. The systems described herein may then store the fetched data in the second data storage location 410.

For example, fetching the external curated/controlled new articles 404 may utilize an API built on top of a web server, and a program/model (e.g., a JavaScript program) may pull the curated news/information related to the requested topic. The systems described herein may then write (e.g., via an encoder) the external curated/controlled new articles 404 to a vector database (e.g., second data storage location 410) with embedding in a vector space for ultra-low latency querying. Fetching the external curated market analysis 406 may include crawling market analysis data relevant to the topic and writing the data into the vector database post-embedding. In certain embodiments, the relevant content from the analysis 406 may be crawled, transformed, and written back in plain text in the corresponding vector database.

Moreover, fetching the curated social network feeds 408 may include the systems described herein pulling the relevant data and information from, e.g., one or more social media APIs using specific programs for each use case. For example, the systems described herein may utilize the Graph API explorer, the Instagram API, an API console tool, and/or any other suitable APIs to pull the relevant data (e.g., text, video, audio, etc.). The systems described herein may authenticate each API using, e.g., OAuth, the systems described herein may parse and transform all the feed data before loading to the vector database to embed the data/text into the corresponding vector space.

With the data from the second data storage location 410, the systems described herein may generate a dynamic prompt and input the prompt into an LLM (block 412). The LLM may then generate/output one or more relevant internal data sources and/or summaries of the internal data sources retrieved from the second data storage location 410 (block 414), which the systems described herein may then integrate with the relevant external data (block 416), e.g., as described in FIGS. 3A and 3B. The systems described herein may then also store this relevant curated data in the third data storage location 418, where it may be retrieved and/or otherwise referenced to re-train one or more of the models described herein (e.g., AI models 107b). In certain embodiments, the second data storage location 410 and/or the third data storage location 418 may comprise and/or otherwise be included as part of the databases described herein, such as the knowledge database 107c, the curated database 107d, and/or other databases or storage locations described herein.

In particular, the dynamic data prompts may be generated from the APIs used to retrieve/access the external data (e.g., topics, related queries, keywords), and may also be stored in the vector database, as part of the third data storage location 418. The systems described herein may also leverage these dynamic data prompts to query an internal AI engine (e.g., as part of the AI agent 107a) to retrieve relevant internal data (e.g., included in the knowledge database 107c). Once the systems described herein gather both the external data and the internal data, the systems described herein may store both sets of data in the vector database, as part of the third data storage location 418, using a text embedding model to embed text into the corresponding vector space, for use in training/re-training the models described herein in the future.

Figure 5:
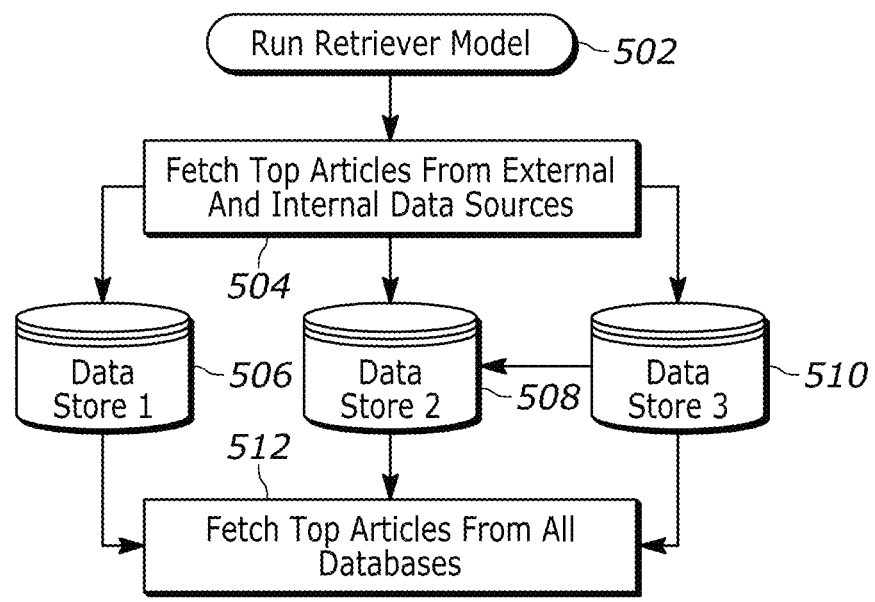
FIG. 5 illustrates a second example offline process portion of the present techniques, in accordance with various embodiments described herein.

FIG. 5 illustrates a second example offline process portion 500 of the present techniques, in accordance with various embodiments described herein. The second example offline process portion 500 generally represents how a retrieval model may retrieve top articles from both internal and external data sources, as describe herein, to provide additional data/information the systems describe herein (e.g., AI agent 107a) may append and/or otherwise utilize when generating prompts for LLMs.

The second example offline process portion 500 includes running the retrieval model (e.g., a RAG model included as part of the AI models 107b) (block 502) to fetch top articles from both internal and external data sources (block 504). In particular, the retriever model may perform parallel runs to fetch the top (e.g., most relevant) articles from the internal and external data sources described herein, such as the first data storage location 506, the second data storage location 508, and the third data storage location 510, which may each be associated with the respective storage locations in each of FIGS. 3A-4. The systems described herein may further fetch the top articles from all storage locations 506-510 to generate the enhanced prompts described herein that, e.g., include appended data from the one or more storage location 506-510 prior to input into the LLMs (block 512).

More specifically, running the retriever model 502 may include the gen AI retriever model utilizing parallel processing frameworks, such as the LangGraph Mutli-Agent to enable concurrent execution of data retrieval tasks (e.g., from the data storage locations 506-510). The systems described herein then invoke the generative AI agent parallelly at block 504 to retrieve the top ranked articles (e.g., top 25 articles) from the various data sources described herein. The models described herein may employ APIs and/or libraries specific to each data source, such as Requests or Scrapy for web scraping, and/or JDBC/ODBC drivers for relational databases (e.g., internal data sources). The systems described herein may also utilize query languages like SQL for relational databases, Elasticsearch DSL for search engines, and/or RESTful APIs for web services to fetch relevant articles. For ranking processes, the systems described herein (e.g., AI agent 107a) may utilize ranking algorithms using Python libraries such as NumPy, pandas, or scikit-learn for machine learning-based ranking, and/or custom algorithms based on relevance scores and metrics.

Moreover, at block 504, the systems described herein ensure foreground execution of the retriever models and/or other AI models (e.g., as part of the AI agent 107a) using frameworks like MEAN or MERN Stack for web applications, asyncio library for asynchronous programming in Python, and/or message brokers like Apache Kafka for asynchronous communication between components for asynchronous communication with the data sets produced in the online retrieval processes (e.g., illustrated in FIG. 3A). The systems described herein may also deploy containerized applications using Docker and orchestration tools like Kubernetes for horizontal scaling, and implement load balancing using NGINX or HAProxy. Additionally, the systems described herein may enable feedback analysis for the AI agent and corresponding models by utilizing data analytics tools, such as Google Analytics or custom analytics dashboards built with libraries like Dash or Plotly python library for user feedback analysis.

Blocks 506-510 further include storing the retrieved data into a vector database, which may include the first, second, and/or third data storage locations 506-510 and searching through the storage locations 506-510 to perform page ranking and RAG Fusion for generating prompts for inputs into LLMs. As part of this data storage and retrieval, the systems described herein may also maintain a configuration file or database mapping the identifiers from the external data sources and curated data sources to the corresponding data sources 506-510.

Block 512 may also generally include the AI agents described herein initiating/performing the steps of summarization and ranking the retrieved data. In particular, the systems described herein may leverage a LangGraph AI agent flow through Chain of Thoughts with Multi Hop Query Generation, as well as a DSPY Signature to facilitate question, choices, reasoning, and/or selection of the AI agent. The systems described herein may also utilize a DSPY Optimizer leveraging BootstrapFewShotWithRandomSearch, and for error handling, the systems described herein may implement, e.g., exception handling using try-except blocks in Python or specific error-handling libraries like RESTful for API development.

Figure 6A:
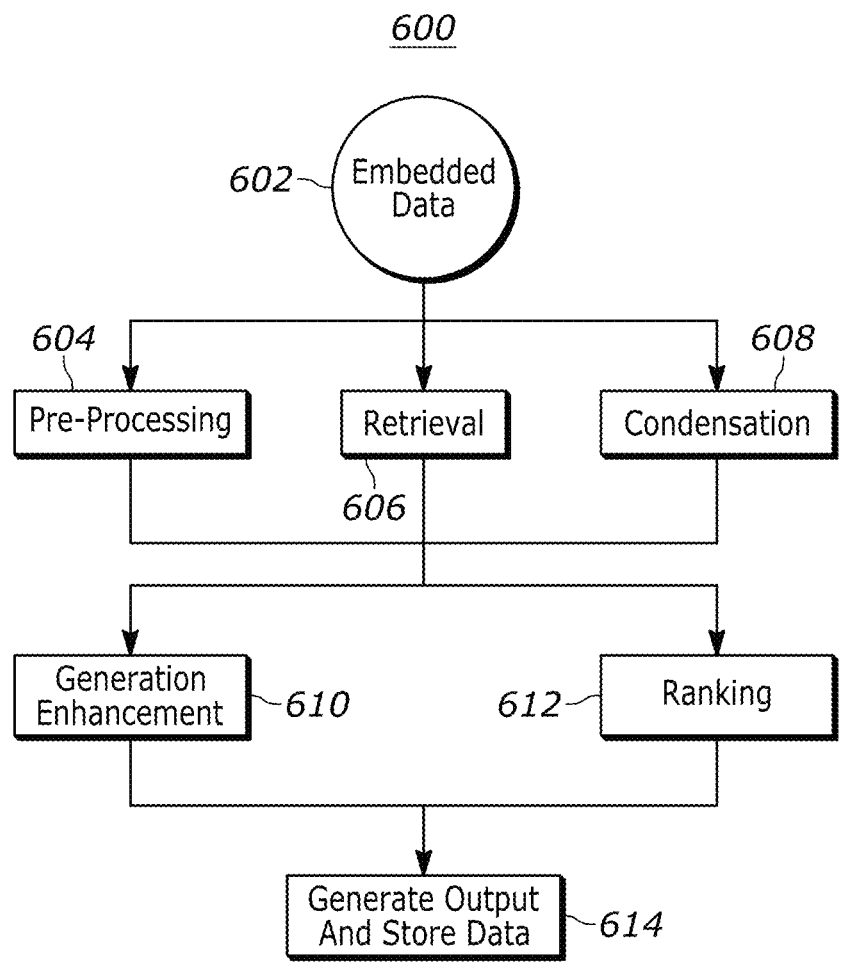
FIG. 6A illustrates a second example online process portion of the present techniques, in accordance with various embodiments described herein.

FIG. 6A illustrates a second example online process portion 600 of the present techniques, in accordance with various embodiments described herein. The second example online process portion 600 may include processing embedded data, generating prompts, and generating outputs based on the prompts. In particular, the AI agent may trigger parallel execution of summary creation by accessing and retrieving data from the embedded data 602 and using semantic routing by following different paths for the external data sources and the internal data sources by breaking the summary creation job into related topics, related queries, and/or related key words branches using Multi Hop Dynamic Query generation.

For example, the systems described herein may retrieve the relevant data 606 associated with the user's input query and perform pre-processing 604 on the data from one or both sources (e.g., internal and external) to remove any noise included therein. The systems described herein may also take the pre-processed data and condense 608 the data by inputting the user query and relevant data into an LLM with instructions to, e.g., summarize key points and/or provide a concise overview of main data/information included in the prompts (e.g., user query, appended external/internal data).

The systems described herein may also utilize the LLMs to enhance the generation processes described herein. For example, at block 610, the systems described herein may leverage the LLMs to ranking and weighing the relevance of the information/data included in the input prompts (e.g., user query, external/internal data). This ranking and weighing may include multiple methods, such as dual function and dynamic weighting. The dual function methods may involve evaluating and prioritizing the outputs or elements generated by the LLMs based on two or more criteria, and these methods allow for a more nuanced assessment of the LLM's outputs, considering factors such as relevance, detail, accuracy, and/or novelty. For example, in the text generation task of the second example online process portion 600, the dual function ranking may involve weighting the LLM outputs both for how well they match the input prompt (relevance) and for the detail of the response.

Dynamic weighting generally involves adjusting the importance or influence of different criteria or features in real-time or based on specific contexts when evaluating the outputs of an LLM. Unlike static weighting, where the weights assigned to different criteria remain constant, dynamic weighting allows for flexibility in how outputs are assessed, depending on the current task, user preferences, or other factors. For instance, in the text generation task of the second example online process portion 600, the systems described herein may increase the weighting of accuracy when dealing with factual queries, while the weighting of detail might be prioritized for nuanced questions.

Further, the second example online process portion 600 includes ranking the data (block 612). This ranking may generally involve scoring words included in the input prompt, and may include term frequency-inverse document frequency, neural network approaches (e.g., BERT techniques), and/or reinforcement learning to optimize the rankings, such that the models described herein may learn from the user interactions as part of a chat session. As an example, the systems described herein (e.g., AI agent 107a) may use a weighted matrix rank based on key word importance using a particular vector (e.g., TF_IDF vector), faithfulness, detail, an overall score, a page rank from a source reference, and/or a re-rank matrix from the retriever agent/model.

Based on these steps of blocks 610, 612, the systems described herein may further generate outputs and store the resulting output data. The systems described herein may present the summary response of both external data sources and internal data sources for a comparative capability with the source reference(s) as a prompt response. As part of this response provided to a user, the systems described herein may also include/display the keywords from the response as a further drill down prompt to initiate the response generation processes described herein, e.g., by appending these keywords to the output generated at block 614.

Figure 6B:
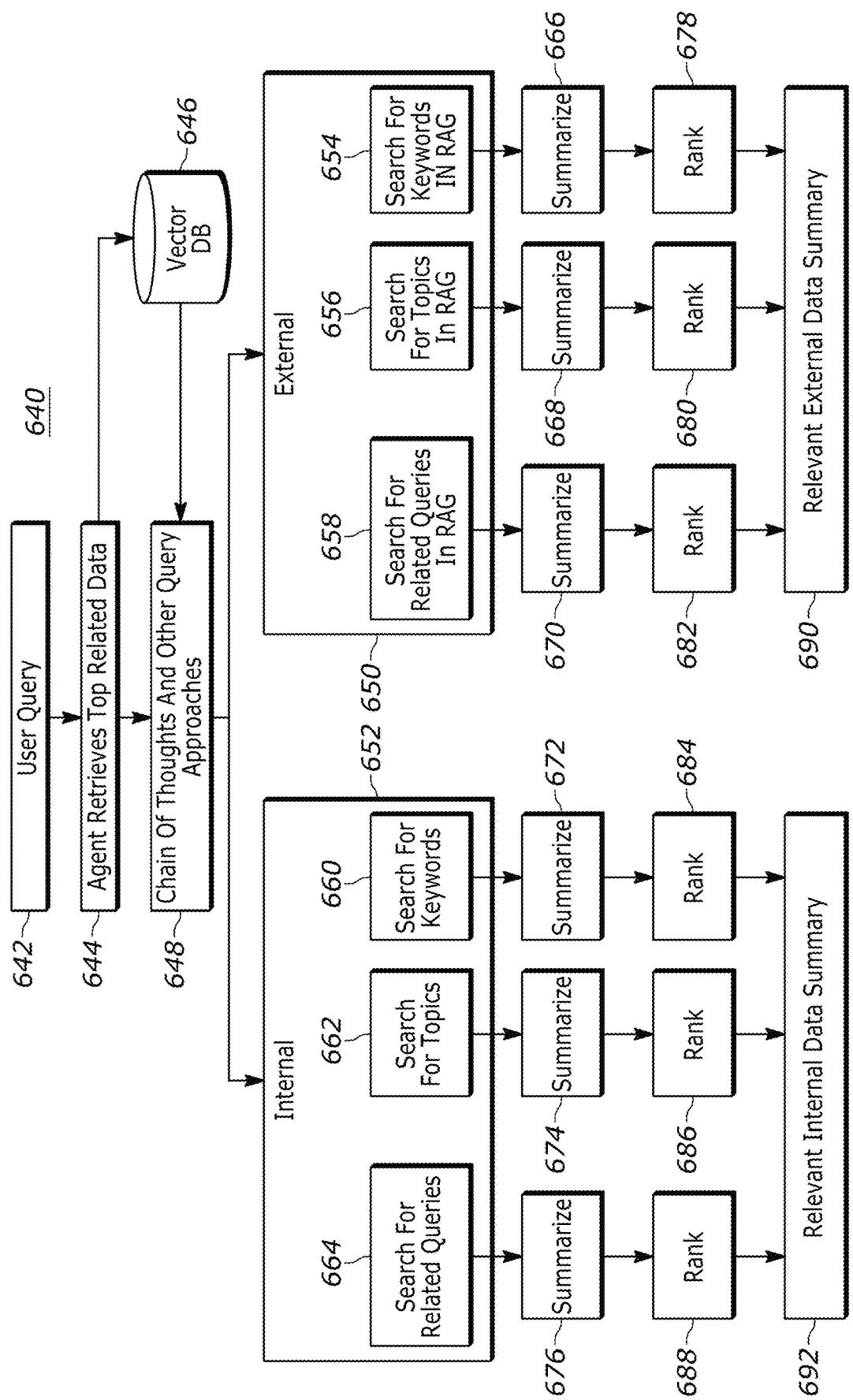
FIG. 6B illustrates an overview data flow expanding on the summarization and ranking performed as part of the output generation of FIG. 6A, in accordance with various embodiments described herein.

FIG. 6B illustrates an overview data flow 640 expanding on the summarization and ranking performed as part of the output generation of FIG. 6A, in accordance with various embodiments described herein. In particular, the overview data flow 640 indicates the sequence of data searching/querying, summarization, and ranking as part of the response/output generation processes described herein.

The overview data flow 640 includes a data query 642 that is received by an AI agent configured to retrieve the top related data 644 from one or more internal/external data sources. These articles from the data sources may be stored in a vector database 646, so the AI agent may query the database 646 to determine one or more relevant articles (e.g., based on similarity scores) that should be appended to the user query 642 and used as input to the LLM for generating an output/response. The AI agent may also orchestrate prompt generation and input to one or more LLMs via Chain of Thoughts and/or other query approaches (e.g., ReAct) 648 to initiate the LLMs analyzing the input prompts.

The first AI model 650 may generally analyze data from one or more external data sources and the second AI model 652 may generally analyze data from one or more internal data sources to determine keywords, topics, or related queries that should be included in prompts as inputs to an LLM. The first AI model 650 may search for keywords 654, topics 656, and/or related queries 658 using a RAG model in the one or more external data sources and/or the vector database 646. The second AI model 652 may search for keywords 660, topics 662, and/or related queries 664 (e.g., using a RAG model) in the one or more internal data sources and/or the vector database 646.

The AI agent may utilize the relevant keywords 654, 660, the relevant topics 656, 662, and the relevant related queries 658, 664 to generate prompts that are input to one or more LLMs configured to summarize each of the included data. For example, the one or more LLMs may summarize the relevant keywords 666, topics 668, and/or related queries 670 from the external data sources when generating the outputs, and/or may summarize the relevant keywords 672, topics 674, and/or related queries 676 from the internal data sources when generating the outputs. The LLMs may further rank each of these summaries for the keywords 678, 684, topics 680, 686, and/or related queries 682, 688, as described herein. Using these ranked summaries, the LLMs and/or other components of the AI agents described herein may generate a relevant external data summary 690, as well as a relevant internal data summary 692. These summaries 690, 692 may be further enhanced via iterative critique and/or context improvement and may be combined to form a single output that is provided to a user in response as part of a chat session, and any data associated with the summaries 690, 692 (e.g., keywords) may be stored in one or more of the data storage locations described herein for training/re-training of the AI models described herein.

Figure 7:
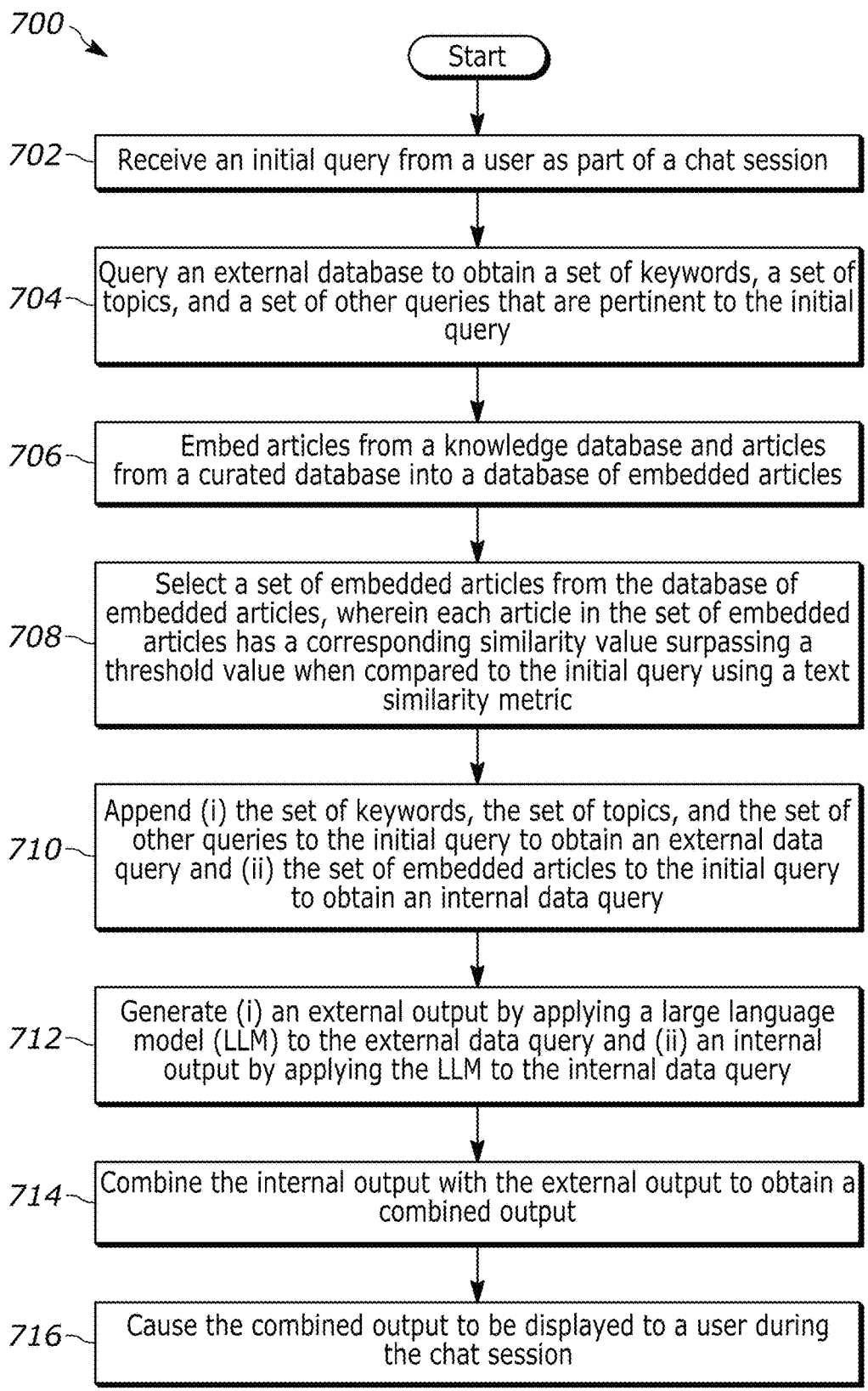
FIG. 7 illustrates an example method for data curation and integration, in accordance with various embodiments described herein.

FIG. 7 illustrates an example method 700 for data curation and integration, in accordance with various embodiments described herein. At least portions of the method 700 may be performed by one or more processors (e.g., processor(s) 102a, 104a) utilizing the embodiments of the user computing device 102, the central server 104, and/or other suitable components of FIG. 1, for example, or by other suitable modules or systems. In embodiments, the method 700 may include additional or alternate steps other than those described herein.

At block 702, the example method 700 includes receiving an initial query from a user as part of a chat session (block 702). The example method 700 further includes querying an external database to obtain a set of keywords, a set of topics, and a set of other queries that are pertinent to the initial query (block 704). The example method 700 further includes embedding articles from a knowledge database and articles from a curated database into a database of embedded articles (block 706).

The example method 700 further includes selecting a set of embedded articles from the database of embedded articles (block 708). Each article in the set of embedded articles may have a corresponding similarity score surpassing a threshold value when compared to the initial query using a text similarity metric. The example method 700 further includes appending (i) the set of keywords, the set of topics, and the set of other queries to the initial query to obtain an external data query and (ii) the set of embedded articles to the initial query to obtain an internal data query (block 710).

The example method 700 further includes generating (i) an external output by applying a large language model (LLM) to the external data query and (ii) an internal output by applying a large language model to the internal data query (block 712). The example method 700 further includes combining the internal output with the external output to obtain a combined output (block 714). The example method 700 further includes causing the combined output to be displayed to a user during the chat session (block 716).

In certain embodiments, the example method 700 further includes executing an artificial intelligence (AI) agent configured to generate one or more prompts for the LLM using a chain of thoughts approach and multi-hop query generation that cause the LLM to (i) summarize and rank content provided in the combined output and (ii) generate one or more intermediate reasoning steps indicating how the LLM reached the combined output.

In certain embodiments, the example method 700 further includes obtaining (i) a first external output and a second external output by applying the LLM to the external data query and (ii) a first internal output and a second internal output by applying the LLM to the internal data query; and iteratively prompting, by executing an AI agent, the LLM to generate the external output and the internal output by incorporating one or more critiques associated with at least one of (i) the first external output, (ii) the second external output, (iii) the first internal output, or (iv) the second internal output into a subsequent prompt.

In certain embodiments, generating the external output and the internal output further includes, generating in parallel, via an AI agent using semantic routing and multi-hop dynamic query generation, (i) one or more external topics to search through an external knowledge base and (ii) one or more internal topics to search through an internal knowledge base; generating in parallel, via the AI agent, (i) an external summary based on the search through the external knowledge base and (ii) an internal summary based on the search through the internal knowledge base; and generating in parallel, via the AI agent, the external output based on the external summary and the internal output based on the internal summary.

In certain embodiments, the example method 700 further includes generating a plurality of external summaries based on the search through the external knowledge base and (ii) a plurality of internal summaries based on the search through the internal knowledge base; determining weighted matrix rankings for each external summary and each internal summary, wherein the weighted matrix rankings are based on: (i) a key word importance value, (ii) a faithfulness value, (iii) a detail value, (iv) a page ranking based on one or more source references, and (v) a re-rank matrix from a retriever agent; and generating the external output and the internal output based on the weighted matrix rankings for each external summary and each internal summary.

In certain embodiments, the example method 700 further includes causing the combined output to be displayed to a user during the chat session. The combined output may include the external summary, the internal summary, and an indication of a source reference from the external knowledge base or the internal knowledge base. The example method 700 further includes receiving a subsequent query corresponding to a keyword of the combined output; appending at least the keyword to the subsequent query; and querying the external database to obtain a subsequent set of keywords, a subsequent set of topics, and a subsequent set of other queries that are pertinent to the subsequent query.

In certain embodiments, the example method 700 further includes storing at least one of: (i) the set of keywords, (ii) the set of topics, (iii) the set of other queries, (iv) the initial query, (v) the external data query, (vi) the internal data query, (vii) the set of embedded articles, (viii) the external output, (ix) the internal output, or (x) the combined output in a chat session storage location; determining an outcome of the chat session; and re-training an AI agent based on the outcome of the chat session and one or more data entries in the chat session storage location.

In certain embodiments, embedding the articles from the knowledge database and the articles from the curated database into the database of embedded articles further includes obtaining an application programming interface (API) key from a custom search engine by creating a project and enabling a custom search API for the project; acquiring a search engine identification (ID) associated with the custom search engine; querying, using the API key and the search engine ID, the custom search engine with a search query based on the initial query; generating, by executing the LLM, a prompt for an AI agent to identify key phrases based on results from the querying the custom search engine; extracting, by executing the AI agent, one or more keywords and one or more topics; embedding the one or more keywords and the one or more topics; and storing the one or more embedded keywords and the one or more embedded topics in the embedding database.

In certain embodiments, the corresponding similarity score associated with each article in the set of embedded articles is not exceeded by the corresponding similarity score associated with any article in the embedded database that is not included in the set of embedded articles.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed is:

1. A computer-implemented method, comprising:
receiving, by one or more processors, an initial query from a user as part of a chat session;
querying, by the one or more processors, an external database to obtain a set of keywords, a set of topics, and a set of other queries that are pertinent to the initial query;
embedding, by the one or more processors, articles from a knowledge database and articles from a curated database into a database of embedded articles;
selecting, by the one or more processors, a set of embedded articles from the database of embedded articles, wherein each article in the set of embedded articles has a corresponding similarity value surpassing a threshold value when compared to the initial query using a text similarity metric;
appending, by the one or more processors, (i) the set of keywords, the set of topics, and the set of other queries to the initial query to obtain an external data query and (ii) the set of embedded articles to the initial query to obtain an internal data query;
generating, by the one or more processors, (i) an external output by applying a large language model (LLM) to the external data query and (ii) an internal output by applying the LLM to the internal data query;
combining, by the one or more processors, the internal output with the external output to obtain a combined output;
executing, by the one or more processors, an artificial intelligence (AI) agent configured to generate one or more prompts for the LLM using a chain of thoughts approach and multi-hop query generation that cause the LLM to (i) summarize and rank content provided in the combined output and (ii) generate one or more intermediate reasoning steps indicating how the LLM reached the combined output; and
causing, by the one or more processors, the combined output to be displayed to a user during the chat session.

2. The computer-implemented method of claim 1, further comprising:

obtaining, by the one or more processors, (i) a first external output and a second external output by applying the LLM to the external data query and (ii) a first internal output and a second internal output by applying the LLM to the internal data query; and iteratively prompting, by the one or more processors executing an AI agent, the LLM to generate the external output and the internal output by incorporating one or more critiques associated with at least one of (i) the first external output, (ii) the second external output, (iii) the first internal output, or (iv) the second internal output into a subsequent prompt.

3. The computer-implemented method of claim 1, wherein generating the external output and the internal output further comprises, in parallel:

generating, by the one or more processors via an AI agent using semantic routing and multi-hop dynamic query generation, (i) one or more external topics to search through the curated database and (ii) one or more internal topics to search through the knowledge database;

generating, by the one or more processors via the AI agent, (i) an external summary based on the search through the curated database and (ii) an internal summary based on the search through the knowledge database; and generating, by the one or more processors via the AI agent, the external output based on the external summary and the internal output based on the internal summary.

4. The computer-implemented method of claim 3, further comprising:

generating, by the one or more processors, a plurality of external summaries based on the search through the curated database and (ii) a plurality of internal summaries based on the search through the knowledge database;

determining, by the one or more processors, weighted matrix rankings for each external summary and each internal summary, wherein the weighted matrix rankings are based on: (i) a key word importance value, (ii) a faithfulness value, (iii) a detail value, (iv) a page ranking based on one or more source references, and (v) a re-rank matrix from a retriever agent; and generating, by the one or more processors, the external output and the internal output based on the weighted matrix rankings for each external summary and each internal summary.

5. The computer-implemented method of claim 3, further comprising:

causing, by the one or more processors, the combined output to be displayed to a user during the chat session, wherein the combined output includes the external summary, the internal summary, and an indication of a source reference from the curated database or the knowledge database;

receiving, at the one or more processors, a subsequent query corresponding to a keyword of the combined output;

appending, by the one or more processors, at least the keyword to the subsequent query; and querying, by the one or more processors, the external database to obtain a subsequent set of keywords, a subsequent set of topics, and a subsequent set of other queries that are pertinent to the subsequent query.

6. The computer-implemented method of claim 1, further comprising:

storing, by the one or more processors, at least one of: (i) the set of keywords, (ii) the set of topics, (iii) the set of other queries, (iv) the initial query, (v) the external data query, (vi) the internal data query, (vii) the set of embedded articles, (viii) the external output, (ix) the internal output, or (x) the combined output in a chat session storage location;

determining, by the one or more processors, an outcome of the chat session; and re-training, by the one or more processors, an AI agent based on the outcome of the chat session and one or more data entries in the chat session storage location.

7. The computer-implemented method of claim 1, wherein embedding the articles from the knowledge database and the articles from the curated database into the database of embedded articles further comprises:

obtaining, by the one or more processors, an application programming interface (API) key from a search engine by creating a project and enabling a search API for the project;

acquiring, by the one or more processors, a search engine identification (ID) associated with the search engine;

querying, by the one or more processors using the API key and the search engine ID, the search engine with a search query based on the initial query;

generating, by the one or more processors executing the LLM, a prompt for an AI agent to identify key phrases based on results from the querying the search engine;

extracting, by the one or more processors executing the AI agent, one or more keywords and one or more topics;

embedding, by the one or more processors, the one or more keywords and the one or more topics; and storing, by the one or more processors, the one or more embedded keywords and the one or more embedded topics in the embedding database.

8. The computer-implemented method of claim 1, wherein the corresponding similarity value associated with each article in the set of embedded articles is not exceeded by the corresponding similarity value associated with any article in the embedded database that is not included in the set of embedded articles.

9. A system comprising:

one or more processors; and a memory storing instructions that, when executed by the one or more processors, cause the system to perform operations comprising:

receiving an initial query from a user as part of a chat session;

querying an external database to obtain a set of keywords, a set of topics, and a set of other queries that are pertinent to the initial query;

embedding articles from a knowledge database and articles from a curated database into a database of embedded articles;

selecting a set of embedded articles from the database of embedded articles, wherein each article in the set of embedded articles has a corresponding similarity value surpassing a threshold value when compared to the initial query using a text similarity metric;

appending (i) the set of keywords, the set of topics, and the set of other queries to the initial query to obtain an external data query and (ii) the set of embedded articles to the initial query to obtain an internal data query;

generating (i) an external output by applying a large language model (LLM) to the external data query and (ii) an internal output by applying the LLM to the internal data query;

combining the internal output with the external output to obtain a combined output;

executing an artificial intelligence (AI) agent configured to generate one or more prompts for the LLM using a chain of thoughts approach and multi-hop query generation that cause the LLM to (i) summarize and rank content provided in the combined output and (ii) generate one or more intermediate reasoning steps indicating how the LLM reached the combined output; and causing the combined output to be displayed to a user during the chat session.

10. The system of claim 9, wherein the instructions, when executed by the one or more processors further cause the system to perform operations comprising:

obtaining (i) a first external output and a second external output by applying the LLM to the external data query and (ii) a first internal output and a second internal output by applying the LLM to the internal data query; and iteratively prompting an AI agent executing the LLM to generate the external output and the internal output by incorporating one or more critiques associated with at least one of (i) the first external output, (ii) the second external output, (iii) the first internal output, or (iv) the second internal output into a subsequent prompt.

11. The system of claim 9, wherein the instructions, when executed by the one or more processors further cause the system to generate the external output and the internal output by, in parallel:

generating via an AI agent using semantic routing and multi-hop dynamic query generation, (i) one or more external topics to search through the curated database and (ii) one or more internal topics to search through the knowledge database;

generating via the AI agent, (i) an external summary based on the search through the curated database and (ii) an internal summary based on the search through the knowledge database; and generating via the AI agent, the external output based on the external summary and the internal output based on the internal summary.

12. The system of claim 11, wherein the instructions, when executed by the one or more processors further cause the system to perform operations comprising:

generating a plurality of external summaries based on the search through the curated database and a plurality of internal summaries based on the search through the knowledge database;

determining weighted matrix rankings for each external summary and each internal summary, wherein the weighted matrix rankings are based on: (i) a keyword importance value, (ii) a faithfulness value, (iii) a detail value, (iv) a page ranking based on one or more source references, and (v) a re-rank matrix from a retriever agent; and generating the external output and the internal output based on the weighted matrix rankings for each external summary and each internal summary.

13. The system of claim 11, wherein the instructions, when executed by the one or more processors further cause the system to perform operations comprising:

causing the combined output to be displayed to a user during the chat session, wherein the combined output includes the external summary, the internal summary, and an indication of a source reference from the curated database or the knowledge database;

receiving a subsequent query corresponding to a keyword of the combined output; appending at least the keyword to the subsequent query; and querying the external database to obtain a subsequent set of keywords, a subsequent set of topics, and a subsequent set of other queries that are pertinent to the subsequent query.

14. The system of claim 9, wherein the instructions, when executed by the one or more processors further cause the system to perform operations comprising:

storing at least one of: (i) the set of keywords, (ii) the set of topics, (iii) the set of other queries, (iv) the initial query, (v) the external data query, (vi) the internal data query, (vii) the set of embedded articles, (viii) the external output, (ix) the internal output, or (x) the combined output in a chat session storage location;

determining an outcome of the chat session; and re-training an AI agent based on the outcome of the chat session and one or more data entries in the chat session storage location.

15. The system of claim 9, wherein the instructions, when executed by the one or more processors further cause the system to embed the articles from the knowledge database and the articles from the curated database into the database of embedded articles by:

obtaining an application programming interface (API) key from a search engine by creating a project and enabling a search API for the project;

acquiring a search engine identification (ID) associated with the search engine;

querying the search engine with a search query based on the initial query using the API key and the search engine ID;

generating a prompt for an AI agent to identify key phrases based on results from the querying the search engine;

extracting one or more keywords and one or more topics; embedding the one or more keywords and the one or more topics; and storing the one or more embedded keywords and the one or more embedded topics in the embedding database.

16. The system of claim 9, wherein the corresponding similarity value associated with each article in the set of embedded articles is not exceeded by the corresponding similarity value associated with any article in the embedded database that is not included in the set of embedded articles.

17. One or more non-transitory computer-readable storage media including instructions that, when executed by one or more processors, cause the one or more processors to:

receive an initial query from a user as part of a chat session;

query an external database to obtain a set of keywords, a set of topics, and a set of other queries that are pertinent to the initial query;

embed articles from a knowledge database and articles from a curated database into a database of embedded articles;

select a set of embedded articles from the database of embedded articles, wherein each article in the set of embedded articles has a corresponding similarity value surpassing a threshold value when compared to the initial query using a text similarity metric;

append (i) the set of keywords, the set of topics, and the set of other queries to the initial query to obtain an external data query and (ii) the set of embedded articles to the initial query to obtain an internal data query;

generate (i) an external output by applying a large language model (LLM) to the external data query and (ii) an internal output by applying the LLM to the internal data query;

combine the internal output with the external output to obtain a combined output;

execute an artificial intelligence (AI) agent configured to generate one or more prompts for the LLM using a chain of thoughts approach and multi-hop query generation that cause the LLM to (i) summarize and rank content provided in the combined output and (ii) generate one or more intermediate reasoning steps indicating how the LLM reached the combined output; and cause the combined output to be displayed to a user during the chat session.

18. The one or more non-transitory computer-readable storage media of claim 17, including instructions that, when executed by one or more processors, cause the one or more processors to:

generate via an AI agent using semantic routing and multi-hop dynamic query generation, (i) one or more external topics to search through the curated database and (ii) one or more internal topics to search through the knowledge database;

generate via the AI agent, (i) an external summary based on the search through the curated database and (ii) an internal summary based on the search through the knowledge database; and generate via the AI agent, the external output based on the external summary and the internal output based on the internal summary.

* * * * *